US010622200B2

(12) United States Patent
Kornilova et al.

(10) Patent No.: US 10,622,200 B2
(45) Date of Patent: Apr. 14, 2020

(54) IONIZATION SOURCES AND SYSTEMS AND METHODS USING THEM

(71) Applicant: PERKINELMER HEALTH SCIENCES CANADA, INC., Woodbridge (CA)

(72) Inventors: Anna Kornilova, Woodbridge (CA); Gholamreza Javahery, Kettleby (CA); Lisa Cousins, Woodbridge (CA)

(73) Assignee: PerkinElmer Health Sciences Canada, Inc., Woodbridge (ON) (CA)

(*) Notice: Subject to any disclaimer, the term of this patent is extended or adjusted under 35 U.S.C. 154(b) by 0 days.

(21) Appl. No.: 15/983,590

(22) Filed: May 18, 2018

(65) Prior Publication Data

US 2019/0355566 A1 Nov. 21, 2019

(51) Int. Cl.
*H01J 49/14* (2006.01)
*G01N 27/62* (2006.01)
*H01J 27/20* (2006.01)
*G01N 27/64* (2006.01)
*H01J 49/42* (2006.01)

(52) U.S. Cl.
CPC .......... *H01J 49/147* (2013.01); *G01N 27/622* (2013.01); *H01J 27/205* (2013.01); *H01J 49/145* (2013.01); *G01N 27/64* (2013.01); *H01J 49/421* (2013.01)

(58) Field of Classification Search
USPC .................. 250/288, 423 R, 424, 427, 423 F
See application file for complete search history.

(56) References Cited

U.S. PATENT DOCUMENTS

| 3,731,089 A | 5/1973 | Elliott | |
| 2012/0112056 A1* | 5/2012 | Brucker | H01J 49/4245 250/282 |
| 2012/0286152 A1* | 11/2012 | Jones | H01J 49/145 250/282 |
| 2013/0206978 A1* | 8/2013 | Verenchikov | H01J 49/147 250/282 |
| 2016/0027630 A1 | 1/2016 | Splendore | |
| 2016/0247669 A1* | 8/2016 | Tateishi | H01J 27/024 |
| 2017/0168031 A1* | 6/2017 | Verenchikov | G01N 30/7206 |

FOREIGN PATENT DOCUMENTS

| CN | 102117728 | 7/2011 |
| JP | 2003257328 | 9/2003 |

OTHER PUBLICATIONS

ISR/WO for PCT/IB2019/053905 dated Sep. 5, 2019.

* cited by examiner

*Primary Examiner* — Kiet T Nguyen
(74) *Attorney, Agent, or Firm* — Rhodes IP PLC; Christopher R Rhodes

(57) ABSTRACT

Certain configurations of ionization sources are described. In some examples, an ionization source comprises an ionization block, an electron source, an electron collector, an ion repeller and at least one electrode configured to provide an electric field when a voltage is provided to the at least one electrode. Systems and methods using the ionization source are also described.

22 Claims, 18 Drawing Sheets

IONIZATION SOURCES AND SYSTEMS AND METHODS USING THEM

TECHNOLOGICAL FIELD

This application is related to ionization sources. More particularly, certain configurations are described herein that are directed to ionization sources comprising an electrode configured to provide an electric field when a voltage is provided to the at least one electrode.

BACKGROUND

Ionization of analytes using high energy electron sources can often lead to extensive fragmentation of the analytes. In some instances, lower levels of fragmentation may be desired.

SUMMARY

Certain aspects, features, embodiments and examples are described below of ionization sources that comprise one or more electrodes. The exact configuration of the source may vary and illustrative sources are provided below to illustrate some of the many possible configurations of the ionization sources. The ionization source can be operated in multiple modes, for example, with the different modes providing different fragmentation patterns of analyte compounds. Selective fragmentation of analytes can be achieved by selecting the particular mode and associated parameters.

In one aspect, an ionization source comprises an ionization block comprising an entrance aperture configured to receive an analyte and an exit aperture configured to permit ionized analyte to exit the ionization block, an electron source fluidically coupled to a first aperture in the ionization block, an electron collector positioned substantially coaxially with the electron source and configured to receive electrons from the electron source, wherein the electron collector is fluidically coupled to a second aperture in the ionization block, an ion repeller positioned adjacent to the entrance aperture in the ionization block and positioned substantially orthogonal to the electron source, and at least one electrode configured to provide an electric field when a voltage is provided to the at least one electrode, e.g., the electrode can provide an electric field adjacent to the electron source or within the ionization block near an aperture where electrons emitted from the electron source enter into the ionization block.

In certain examples, the at least one electrode is positioned adjacent to the electron source. In some embodiments, the at least one electrode is positioned adjacent to the electron collector. In other examples, the electron source comprises a plurality of independent filaments present in a filament cup lens assembly. In some examples, the source comprises a processor electrically coupled to the at least one electrode and configured to provide one voltage to the at least one electrode in one mode of the ionization source and configured to provide another voltage to the at least one electrode in another mode of the ionization source. In some examples, the source comprises at least one lens positioned adjacent to the exit aperture and configured to guide the ionized analyte in the ionization block toward the exit aperture. In other examples, the source comprises a second electrode, wherein the at least one electrode is positioned adjacent to the electron source and the second electrode is positioned adjacent to the electron collector. In certain examples, the source comprises at least one magnet positioned adjacent to and outside of the ionization block. In some embodiments, the at least one electrode is configured to receive a direct current voltage to provide a direct current electric field, e.g., adjacent to an electron source or adjacent to or near an aperture of the ionization block. In certain instances, the ionization block is configured to directly couple to a mass analyzer.

In another aspect, a chemical ionization source comprises an ionization block comprising an entrance aperture configured to receive an analyte and an exit aperture configured to permit ionized analyte to exit the ionization block, wherein the ionization block is configured to receive an ionization gas through a first inlet or port in the ionization block (or may receive an ionization gas through a common inlet where sample is introduced), an electron source fluidically coupled to a first aperture in the ionization block, an electron collector positioned substantially coaxially with the electron source and configured to receive electrons from the electron source, wherein the electron collector is fluidically coupled to a second aperture in the ionization block, an ion repeller positioned adjacent to the entrance aperture in the ionization block and positioned substantially orthogonal to the electron source, and at least one electrode configured to provide an electric field when a voltage is provided to the at least one electrode, e.g., the electrode can provide an electric field adjacent to the electron source or within the ionization block near an aperture where electrons emitted from the electron source enter into the ionization block.

In certain examples, the ionization block is configured to couple to a vacuum source, e.g., the ionization block can be fluidically coupled to a vacuum source through a port in the ionization block. Alternatively, the entire ionization block can be inserted into a vacuum chamber. In some embodiments, the at least one electrode is positioned adjacent to the electron source. In other embodiments, the at least one electrode is positioned coaxially with the electron source. In certain examples, the electron source comprises a plurality of independent filaments present in a filament cup lens assembly. In some configurations, the source comprises a processor electrically coupled to the at least one electrode and configured to provide one voltage to the at least one electrode in one mode of the chemical ionization source and configured to provide another voltage to the at least one electrode in another mode of the chemical ionization source. In other configurations, the source comprises at least one lens positioned adjacent to the exit aperture and configured to guide the ionized analyte in the ionization block toward the exit aperture. In further embodiments, the source comprises at least one magnet positioned adjacent to and outside of the ionization block. In other examples, the at least one electrode is configured to receive a direct current voltage to provide a direct current electric field. In some examples, the ionization block is configured to directly couple to a mass analyzer.

In an additional aspect, mass spectrometer system comprises and ionization source and a mass analyzer fluidically coupled to the ionization source. In some configurations, the ionization source comprises an ionization block comprising an entrance aperture configured to receive an analyte and an exit aperture configured to permit ionized analyte to exit the ionization block, an electron source fluidically coupled to a first aperture in the ionization block, an electron collector positioned substantially coaxially with the electron source and configured to receive electrons from the electron source, wherein the electron collector is fluidically coupled to a second aperture in the ionization block, an ion repeller positioned adjacent to the entrance aperture in the ionization block and positioned substantially orthogonal to the electron source, and at least one electrode configured to provide an electric field when a voltage is provided to the at least one electrode. In certain examples, the mass analyzer can be fluidically coupled to the exit aperture of the ionization block.

In certain configurations, the mass spectrometer system may comprise a lens assembly positioned between the exit aperture and an inlet of the mass analyzer. In some examples, the electron source comprises a plurality of independent filaments present in a filament cup lens assembly. In some examples, the mass spectrometer system may comprise a processor electrically coupled to the at least one electrode and configured to provide the voltage to the at least one electrode. In some instances, the processor is electrically coupled to the filament lens cup assembly and is configured to provide a voltage to one of the plurality of independent filaments. In certain examples, the processor is configured to provide a second voltage to the at least one electrode in a second mode of the ionization source. In other examples, the mass analyzer comprises at least one quadrupole assembly fluidically coupled to the exit aperture. In certain embodiments, the mass spectrometer system may comprise at least one pumping stage positioned between the exit aperture of the ionization block and an inlet of the at least one quadrupole assembly. In other examples, the at least one electrode is configured to receive a direct current voltage to provide a direct current electric field. In some examples, the mass spectrometer can be coupled to a chromatography system that is fluidically coupled to the entrance aperture of the ionization block.

In another aspect, a mass spectrometer system comprises a chemical ionization source and a mass analyzer fluidically coupled to the ionization source. In some configurations, the chemical ionization source comprises an ionization block comprising an entrance aperture configured to receive an analyte and an exit aperture configured to permit ionized analyte to exit the ionization block, wherein the ionization block is configured to receive an ionization gas through a first inlet in the ionization block, an electron source fluidically coupled to a first aperture in the ionization block, an electron collector positioned substantially coaxially with the electron source and configured to receive electrons from the electron source, wherein the electron collector is fluidically coupled to a second aperture in the ionization block, an ion repeller positioned adjacent to the entrance aperture in the ionization block and positioned substantially orthogonal to the electron source, and at least one electrode configured to provide an electric field when a voltage is provided to the at least one electrode. In certain instances, the mass analyzer can be fluidically coupled to the exit aperture of the chemical ionization source.

In certain configurations, the mass spectrometer system comprises a lens assembly positioned between the exit aperture and an inlet of the mass analyzer. In some examples, the electron source comprises a plurality of independent filaments present in a filament cup lens assembly. In other examples, the mass spectrometer system comprises a processor electrically coupled to the at least one electrode and configured to provide the voltage to the at least one electrode in a first mode of the chemical ionization source. In certain embodiments, the processor can be electrically coupled to the filament lens cup assembly and is configured to provide a voltage to one of the plurality of independent filaments. In some examples, the processor is configured to provide another voltage to the at least one electrode in another mode of the chemical ionization source. In certain examples, the mass analyzer comprises at least one quadrupole assembly fluidically coupled to the exit aperture. In other examples, the mass spectrometer system comprises at least one pumping stage positioned between the exit aperture of the ionization block and an inlet of the at least one quadrupole assembly. In some embodiments, the at least one electrode is configured to receive a direct current voltage to provide a direct current electric field. In other embodiments, the mass spectrometer system is coupled to a chromatography system fluidically coupled to the entrance aperture of the ionization block.

In another aspect, a method of ionizing an analyte comprises introducing the analyte into an ionization chamber comprising an electron source and an electron collector positioned coaxially with the electron source and configured to receive electrons from the electron source, wherein the ionization source further comprises at least one electrode coupled configured to provide an electric field when a voltage is provided to the at least one electrode.

In certain configurations, the method comprises selecting the voltage provided to the at least one electrode to increase production of a parent analyte ion produced from ionization of the introduced analyte. In other examples, the method comprises configuring the ionization chamber as an ionization block and further comprising introducing the analyte into the ionization block orthogonally to an electron flow from the electron source to the electron collector. In some embodiments, the method comprises introducing a first analyte into the ionization chamber and providing a first voltage to the at least one electrode when the first analyte is introduced into the ionization chamber to provide ionized first analyte, permitting the ionized first analyte to exit the ionization chamber through the exit aperture of the ionization chamber, and introducing a second analyte into the ionization chamber and providing a second voltage to the at least one electrode when the second analyte is introduced into the ionization chamber to provide ionized second analyte, wherein the provided first voltage is different than the provided second voltage. In some examples, the method comprises providing a direct current voltage of about 60 Volts to about 160 Volts to the electron source, a direct current voltage of about 0 Volts to about 10 Volts to the electron collector, and a direct current voltage of about 0 Volts to about −50 Volts to the at least one electrode. In some examples, the method comprises configuring the electron source to comprise a plurality of independent filaments. In other examples, the method comprises using a processor to provide a voltage to one of the plurality of independent filaments to provide electrons from the one of the plurality of independent filaments into the ionization chamber. In certain examples, the method comprises using the processor to provide the voltage to the at least one electrode. In other examples, the method comprises using the processor to provide a voltage to a different one of the plurality of independent filaments to provide electrons from the different one of the plurality of independent filaments into the ionization chamber. In some instances, the method comprises configuring the ionization chamber with a second electrode coupled to the ionization chamber.

In an additional aspect, a method of ionizing an analyte comprises introducing the analyte into an ionization chamber comprising an electron source and a port for introducing an ionization gas into the ionization chamber, wherein the ionization source further comprises at least one electrode configured to provide an electric field when a voltage is provided to the at least one electrode. Alternatively, ionization gas can be introduced into the ionization chamber through a common inlet where sample is also introduced into the ionization chamber.

In certain examples, the method comprises selecting the voltage provided to the at least one electrode to increase production of a parent analyte ion produced from ionization of the introduced analyte.

In some embodiments, the method comprises introducing a first analyte into the ionization chamber and providing a first voltage to the at least one electrode when the first analyte is introduced into the ionization chamber to provide ionized first analyte, permitting the ionized first analyte to exit the ionization chamber through an exit aperture of the ionization chamber, and introducing a second analyte into the ionization chamber and providing a second voltage to the at least one electrode when the second analyte is introduced into the ionization chamber to provide ionized second analyte, wherein the provided first voltage is different than the provided second voltage.

In other examples, the method comprises introducing a first analyte and a first ionization gas into the ionization chamber and providing a first voltage to the at least one electrode when the first analyte is introduced into the ionization chamber to provide ionized first analyte, permitting the ionized first analyte to exit the ionization chamber through an exit aperture of the ionization chamber, and introducing a second analyte and a second ionization gas into the ionization chamber and providing the first voltage to the at least one electrode when the second analyte is introduced into the ionization chamber to provide ionized second analyte.

In some examples, the method comprises introducing a first analyte and a first ionization gas into the ionization chamber and providing a first voltage to the at least one electrode when the first analyte is introduced into the ionization chamber to provide ionized first analyte, permitting the ionized first analyte to exit the ionization chamber through an exit aperture of the ionization chamber, and introducing a second analyte and a second ionization gas into the ionization chamber and providing a second voltage to the at least one electrode when the second analyte is introduced into the ionization chamber to provide ionized second analyte, wherein the provided first voltage is different than the provided second voltage.

In certain configurations, the method comprises providing a direct current voltage of about 60 Volts to about 160 Volts to the electron source, a direct current voltage of about 0 Volts to about 10 Volts to the electron collector, and a direct current voltage of about 0 Volts to about −50 Volts to the at least one electrode. In some examples, the method comprises configuring the ionization chamber as an ionization block and configuring the electron source to comprise a plurality of independent filaments. In certain examples, the method comprises using a processor to provide a voltage to one of the plurality of independent filaments to provide electrons from the one of the plurality of independent filaments into the ionization chamber. In some instances, the method comprises using the processor to provide the voltage to the at least one electrode. In some embodiments, the method comprises using the processor to provide a voltage to a different one of the plurality of independent filaments to provide electrons from the different one of the plurality of independent filaments into the ionization chamber. In some examples, the method comprises configuring the ionization chamber with a second electrode coupled to the ionization chamber.

In another aspect, a field ionization source comprises an emitter configured to electrically couple to a power source, wherein the emitter is configured to receive and retain a sample on a surface of the emitter, and wherein the field ionization source further comprises at least one electrode configured to provide an electric field adjacent to the emitter when a voltage is provided to the at least one electrode.

In some examples, the field ionization source comprises a processor electrically coupled to the at least one electrode and configured to provide a first voltage to the at least one electrode in a first mode of the field ionization source and configured to provide a second voltage to the at least one electrode in a second mode of the field ionization source. In other examples, the emitter is configured as a single tip emitter, a wire emitter or a blade emitter.

In another aspect, a kit comprises one or more of the ionization sources described herein and instructions for using the ionization source(s) with a mass spectrometer to identify, quantitate or both identify and quantitate an analyte.

In an additional aspect, a method of facilitating ionization of an analyte comprises providing one or more of the ionization sources described herein and providing instructions for using the ionization source(s) to ionize an analyte.

In another aspect, a method comprises providing a voltage to an electrode of an ionization source comprising the electrode, an electron source and an electron collector positioned coaxially with the electron source to enhance formation of parent analyte ion produced from an analyte provided to the ionization source.

In an additional aspect, a method comprises providing a voltage to an electrode of an ionization source comprising the electrode, an electron source and an electron collector positioned coaxially with the electron source to selectively provide fragments produced from an analyte provided to the ionization source.

Additional aspects, examples, features, configurations and embodiments are described in more detail below.

BRIEF DESCRIPTION OF THE SEVERAL VIEWS OF THE DRAWINGS

Certain illustrations of ionization sources are described with reference to the accompanying figures in which.

The components in the figures are not necessarily shown to scale, and the various sizes and dimensions of one component, relative to the sizes or dimensions of the other components, may vary. No particular thickness or geometrical shape of any component is intended to be implied by the representations in the figures unless otherwise indicated in the description below.

DETAILED DESCRIPTION

It will be recognized by the person of ordinary skill in the art, given the benefit of this disclosure, that the exact arrangement and positioning of the electrode(s) and other components of the ionization sources described herein may vary. Further, the exact shape, size and configuration of the ionization chamber, or space between the various components that can form an ionization chambers, any wire filaments, collectors, repellers, apertures, lenses, etc. may also vary as desired.

In certain embodiments, the ionization sources described herein may comprise one or more electrodes configured to provide an electric field within an ionization chamber. The exact nature, shape, field strength, etc. of the electric field can vary. In some examples, the electric field is configured to alter the overall fragmentation pattern of analyte ions provided into the ionization chamber to permit selective tuning of ionization of analyte molecules within the ionization chamber. For example, an electric field can be provided by applying a voltage to the electrode which can result in a different fragmentation pattern of ions. In some examples, more than a single electrode can be present to provide additional tuning capacity. Further, different voltages can be provided to the electrode to alter the fragmentation within the ionization chamber. In some examples, an increased number of intact parent ions can be produced using the devices described herein versus using conventional electron ionization sources. The use of intact parent ions to identify and/or quantitate analytes can avoid the use of analyte libraries and permits the use of the parent analyte ion peak itself to quantitate the analyte. If desired, however, selective fragmentation of the parent analyte ion may also be performed using the devices and methods described herein. For example by selecting the particular voltage provided to the electrode, enhanced production of parent ion and/or controlled fragmentation of the analyte ion can be achieved. In addition, it may be desirable to change the voltage provided to the electrode with different analytes (or during introduction of a single analyte) to provide varied fragmentation patterns and/or varied amounts of parent ion for different analytes.

Figure 1A:
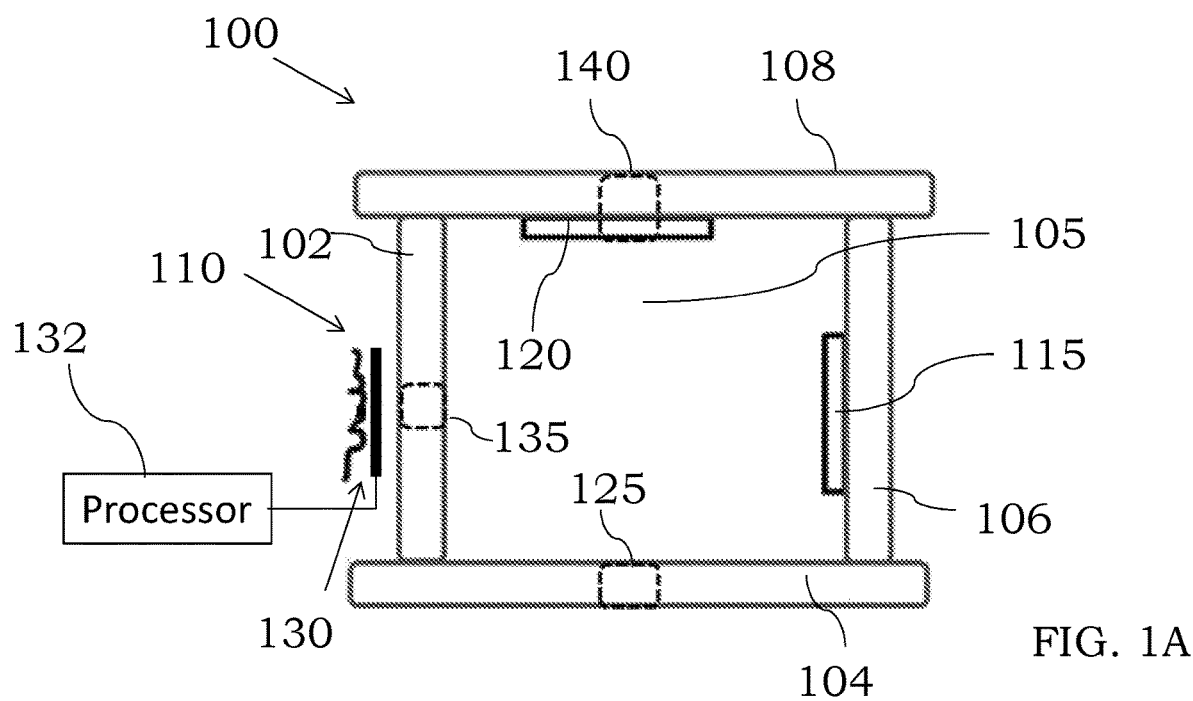
FIG. 1A is an illustration of an ionization source, in accordance with some examples.
Figure 1B:
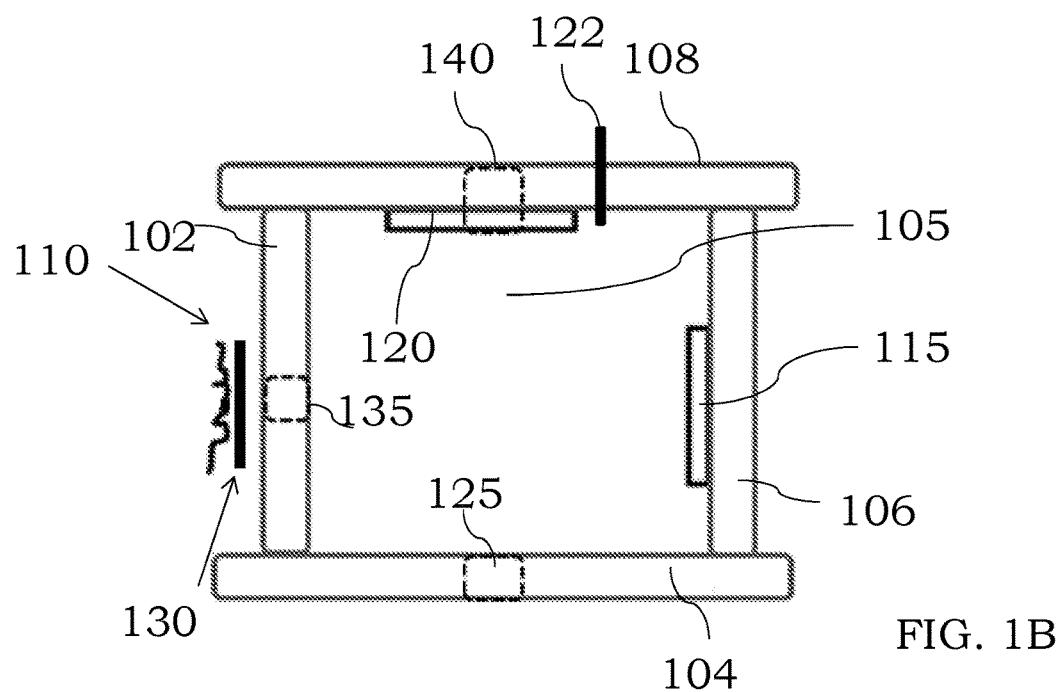
FIG. 1B is an illustration of an ionization source comprising a port for introduction an ionization gas, in accordance with some examples.
Figure 1C:
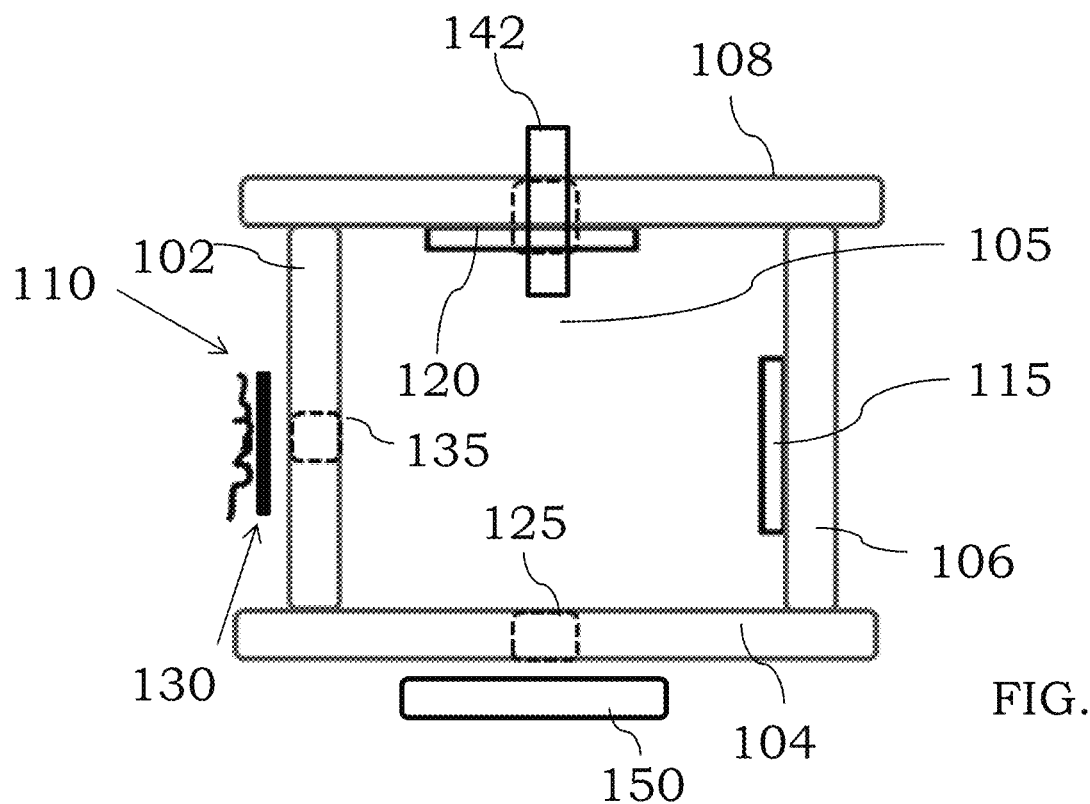
FIG. 1C is an illustration of an ionization source comprising an exit lens, in accordance with certain embodiments.

In some configurations, the ionization source may comprise an ionization chamber. The ionization chamber can be a space that is formed by positioning of the other components of the ionization source in a suitable manner or may be an ion block that can be electrically coupled to a power source if desired. Referring to FIG. 1A, an ionization source 100 is shown comprising an electron source 110, an electron collector 115, an ion repeller 120, an exit aperture 125 and an electrode 130. The various components can be mounted or coupled to supporting structures 102, 104, 106, and 108 which when positioned suitably form an ionization chamber 105 between the various components 102, 104, 106 and 108. As shown in FIG. 1B, a port or inlet 122 may be present to provide an ionization gas into the space formed by the components to permit the use of chemical ionization. As noted herein, however, and as shown in FIG. 1C a common inlet or aperture 142 can be used to introduce both analyte sample and an ionization gas. Referring again to FIG. 1A, the electron source 110 typically comprises one or more filaments that when heated may emit electrons which can enter into the chamber 105 by way of an aperture 135 in the supporting structure 102. The electron collector 115 can be positioned substantially coaxially with the electron source 110 so that electrons are guided from the electron source 110 toward the collector 115. The ion repeller 120 may comprise a suitable charge to repel ionized species produced in the chamber 105. For example, as an analyte enters into the chamber 105 through an entrance aperture 140, the analyte molecules can be ionized by electron emitted from the source 110. Where positively charged ions are produced in the chamber 105, the ion repeller 120 may comprise a positive charge. An exit aperture 125 can be suitably positioned in the supporting structure 104 so ions produced within the chamber 105 may exit the chamber 105 and be provided to a downstream component (not shown). The electrode 130 can be electrically coupled to a power source (not shown) so a voltage may be provided to the electrode 130. The electrode 130 can be positioned between the electron source 110 and the aperture 135 such that an electric field may be provided through which the emitted electrons from the source traverse. The voltage provided to the electrode 130 can provide this electric field within the chamber 105 (or at an edge thereof near the aperture 135). The exact nature and amplitude of the voltage provided to the electrode 130 may vary and illustrative voltages are described in more detail below. While a single electrode 130 is shown, two or more electrodes may be present and may receive a different voltage from a common or separate power sources. For example, an electrode or lens assembly can be preset between the source 110 and the aperture 135. In addition, where a single electrode is present, the electrode can be positioned in various places as discussed in more detail below.

In some embodiments, the electrode 130 can be positioned adjacent to the electron source 110. In other examples, the electrode 130 can be positioned adjacent to the electron collector 115. The electron source 110 may comprise one, two, three, four or more filaments which can be arranged in a filament cup lens assembly as described in more detail below. In some examples, a processor 132 can be electrically coupled to the electrode 130. The processor 132 may be configured to execute one or more instructions that result in a voltage being provided to the electrode 130. In some embodiments, a first voltage can be provided to the electrode 130 in a first mode of the ionization source 100, and a second voltage can be provided to the electrode 130 in a second mode of the ionization source 100. If desired, no voltage may be provided to the electrode 130, and the ionization source 100 can function similar to a conventional electron ionization or chemical ionization source. An optional lens or lens assembly 150 (see FIG. 1C) may be present at the exit aperture 125 of the ionization chamber 105. The lens 150 can be configured to guide ionized analyte within the chamber 105 toward the exit aperture 125.

In certain embodiments, the exact number of electrodes present in the ionization sources may be one, two, three, four or more. In addition, the exact thickness, shape and geometry of the electrodes can also vary. In some examples, the electrodes may take the form of a circular electrode comprising a central aperture through which electrons or ions may pass. In some embodiments, the electrodes may be linear electrodes that can be positioned suitable to form an aperture between the electrodes. Complex electrode shapes and electrodes with more than a single aperture may also be used.

In certain examples, the exact number of filaments that may be present in a filament electron source may vary. For example, one, two, three, four or more independent filaments can be present. The filaments may be the same or may be different. In some examples, a processor may control which filament (and/or how many filaments) receive a voltage to control emissions from the filament assembly. Suitable filaments include those comprising tungsten, tungsten alloys and other metals that can emit electrons when a current is provided through the filament. If desired, a voltage can be provided simultaneously to two or more filaments.

Figure 2A:
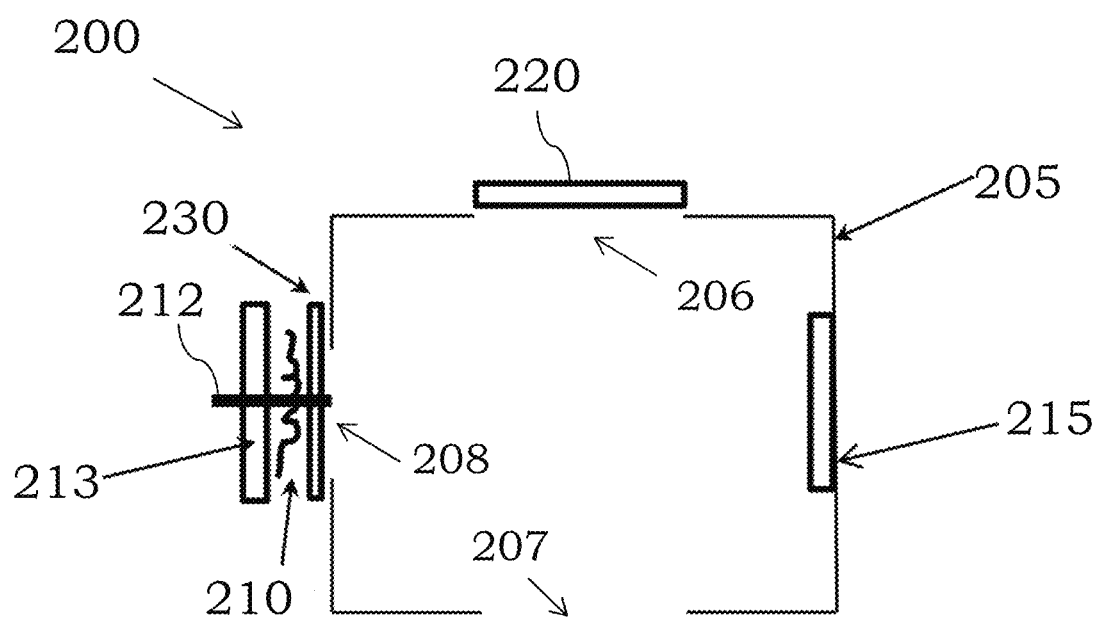
FIG. 2A is an illustration of an ionization source comprising an ionization block, in accordance with certain examples.
Figure 2B:
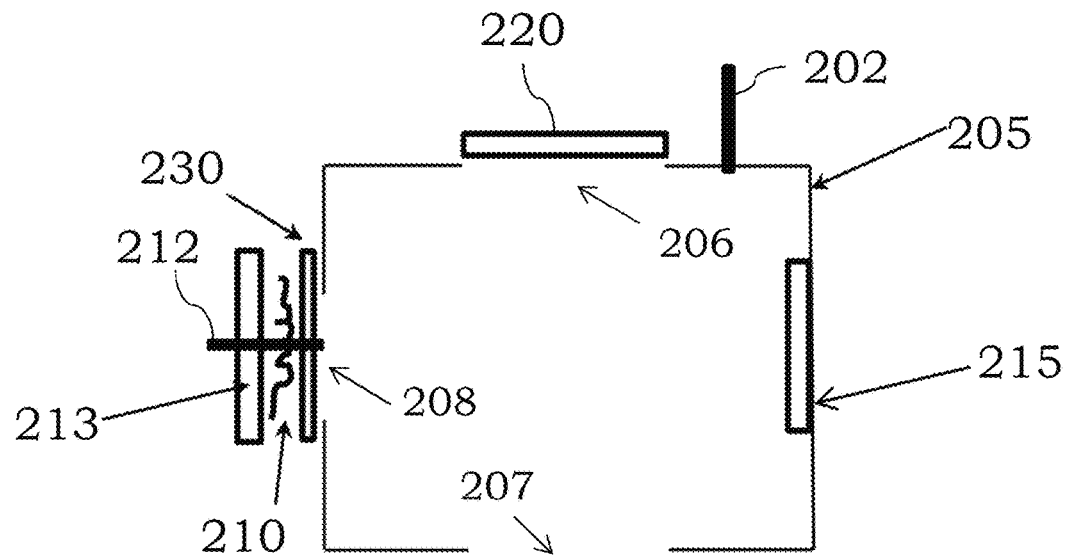
FIG. 2B is an illustration of a chemical ionization source comprising an ionization block, in accordance with certain examples.

In certain configurations, the ionization source may comprise an ionization block which can be electrically coupled to a power source. Referring to FIG. 2A, an ionization source 200 comprises an ionization block 205, an electron source 210, an electron collector 215, an ion repeller 220, an entrance aperture 206 in the ionization block 205, an exit aperture 207 in the ionization block 205, and an electrode 230. As shown in FIG. 2B, the ionization block 205 may comprise an inlet or port 202 configured to receive an ionization gas to permit the use of chemical ionization within the ionization block 205. For example, the electrons emitted from the source 210 may collide with the introduced ionization gas to provide ionized gas. The ionized gas may then be used to ionize one or more analyte molecules introduced into the ionization source 200 through the entrance aperture. Referring again to FIG. 2A, the electron source 210 typically comprises one or more filaments that when heated may emit electrons. In FIG. 2A, the filament and electrode 230 may be part of a filament cup assembly held together with one or more rods 212. One or more braces such as brace 213 may also be present in the filament cup assembly. The emitted electrons from the source 210 can be introduced into the ionization block 205 through an aperture 208. When a voltage is provided to the electrode 230, which typically comprises an aperture, the emitted electrons travel through an electric field provided by the electrode 230. The electric field from the electrode 230 can alter the fragmentation pattern of the ions. The exact nature and amplitude of the voltage provided to the electrode 230 may vary and illustrative voltages are described in more detail below. The electron collector 215 can be positioned substantially coaxially with the electron source 210 so that electrons are guided from the electron source 210 toward the collector 215. For example, the collector 215 can be positioned coaxially or across from the electron source 210. The ion repeller 220 may comprise a suitable charge to repel ionized species produced in the block 205. For example, where positively charged ions are produced in the block 205, the ion repeller 220 may comprise a positive charge. The exit aperture 207 in the block 205 can be suitably positioned so ions produced within the block 205 may exit the block 205 and be provided to a downstream component. While a single electrode 230 is shown, two or more electrodes may be present and may receive a different voltage from a common or separate power sources. The electrode 230 can be coupled to the ionization block 205 or may be spatially separated from the ionization block 205, e.g., positioned outside of or within the ionization block 205.

Figure 2C:
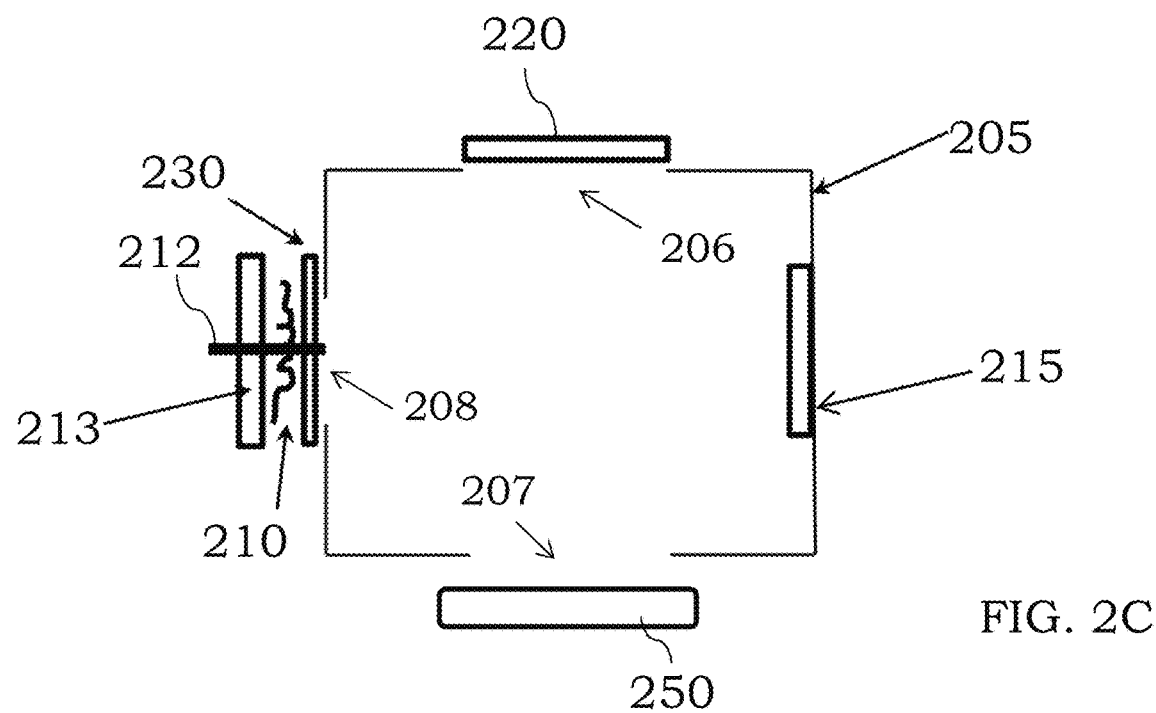
FIG. 2C is an illustration of an ionization source comprising a lens, in accordance with certain examples.

In some embodiments, the electrode 230 can be positioned adjacent to the electron source 210. In other examples, the electrode 230 can be positioned adjacent to the electron collector 215. The electron source 210 may comprise one, two, three, four or more filaments which can be arranged in a filament cup lens assembly as described in more detail below. In some examples, a processor can be electrically coupled to the electrode 230. The processor may be configured to execute one or more instructions that result in a voltage being provided to the electrode 230. In some embodiments, a first voltage can be provided to the electrode 230 in a first mode of the ionization source 200, and a second voltage can be provided to the electrode 230 in a second mode of the ionization source 200. If desired, no voltage may be provided to the electrode 230, and the ionization source 200 can function similar to a conventional electron ionization or chemical ionization source. An optional lens or lens assembly 250 (see FIG. 2C) may be present at the exit aperture 207 of the ionization block 205. The lens 250 can be configured to guide ionized analyte within the block 205 toward the exit aperture 207.

In certain embodiments, the exact nature and type of voltage provided to the various components of the ionization sources may vary. In some examples, a direct current voltage, an alternating current voltage or a radio frequency current can independently be provided to the electrode, the electron source, the electron collector, the lens, the ion repeller, etc. In some examples, a direct current voltage of about 60 Volts to about 160 Volts can be provided to the electron source. In other examples, a direct current voltage of about 0 Volts to about 10 Volts can be provided to the electron collector. In further examples, a direct current voltage of about 0 Volts to about −50 Volts can be provided to the at least one electrode. In certain examples, a direct current voltage of about 0 Volts to about +50 Volts can be provided to the ionization block. The voltages may be provided from a common power source or separate power sources if desired. Where a direct current is provided to the electrode, a resulting direct current electric field can be produced adjacent to an electron source and/or within the ionization chamber or block.

In examples where the ionization source is configured as a chemical ionization source, the exact gas introduced into the ionization chamber or block can vary. In some examples, the ionization gas may be one or more of methane, ammonia, hydrogen, isobutene, dimethylether, acetone, acetaldehyde, benzene, iodomethane, diisopropylether, nitrogen, chlorobenzene, xenon, argon, carbon oxysulfide, carbon disulfide, carbon monoxide, nitrogen oxide, nitrous oxide, and mixtures thereof. The ionization gas is typically introduced at a high concentration, e.g., 100×, 200×, 500× or 1000× or more greater than the analyte concentration, to favor collisions between the ionization gas and electrons from the electron source and to shield any analyte molecules from colliding directly with the electrons emitted from the electron source. The exact methodology by which the ionization gas can ionize analyte species may vary and includes, but is not limited to, proton transfer, electrophilic addition, anion abstraction, electron capture/attachment and/or charge exchange.

Figure 3A:
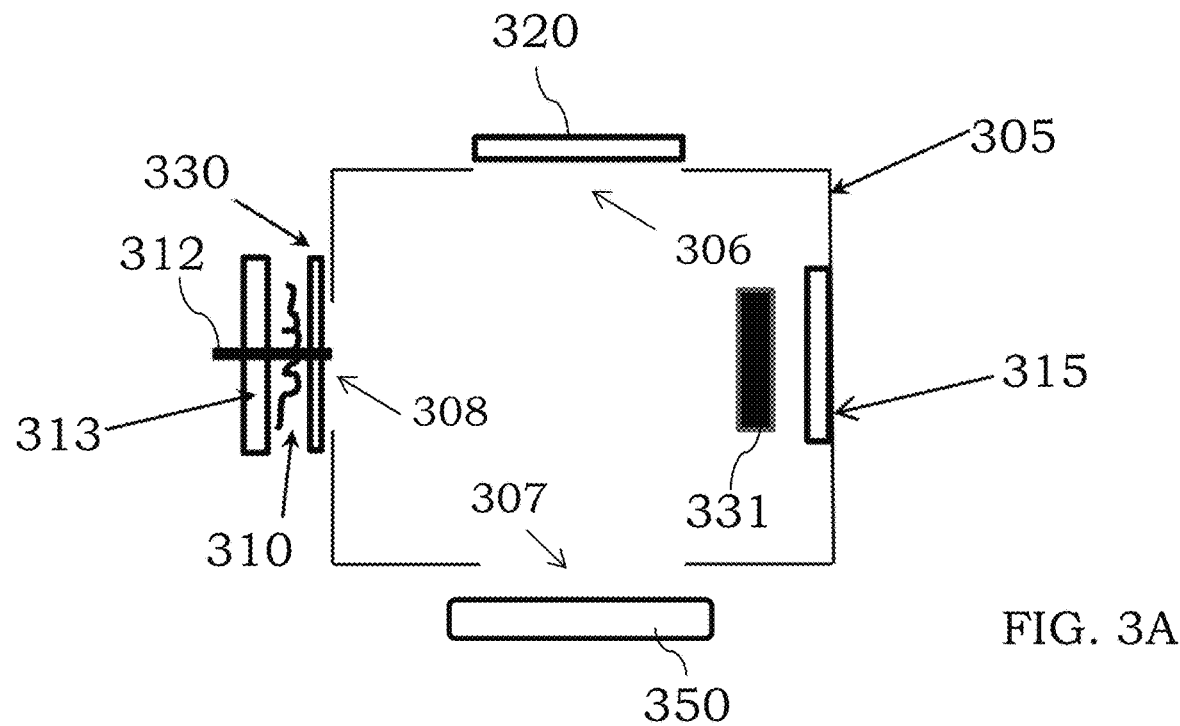
FIG. 3A is an illustration of an ionization source comprising two electrodes, in accordance with certain configurations.
Figure 3B:
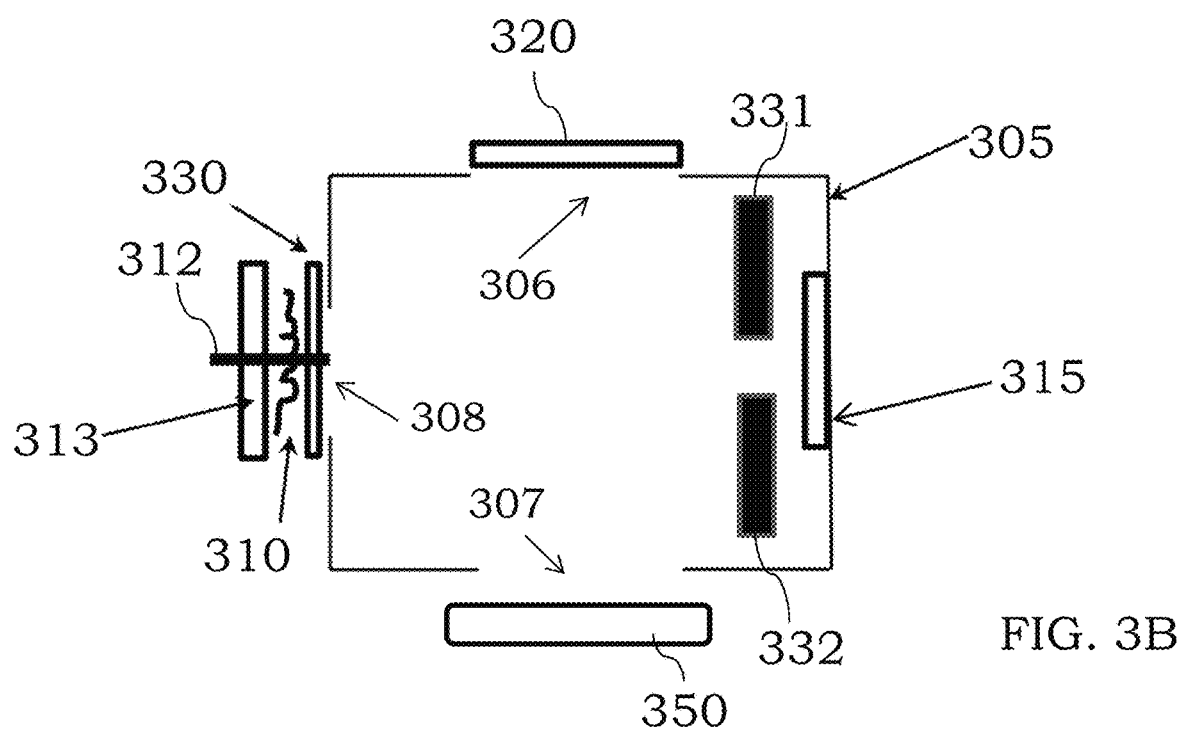
FIG. 3B is an illustration of an ionization source comprising three electrodes, in accordance with certain configurations.

In certain embodiments, the ionization sources described herein may comprise more than one electrode. Referring to FIG. 3A, an ionization source is shown as comprising an ionization block 305, an electron source 310 in the form of one or more wire filaments, an electron collector 315, an ion repeller 320, a first electrode 330, a second electrode 331, and an exit lens 350. Electrons emitted from the electron source can travel through an aperture in the electrode 330 and an aperture 308 in the block 305. The electron collector 315 can be positioned coaxially with the electron source 310 and may be positioned adjacent to an electrode 331, which can receive a voltage and provide an electric field near the collector 315. The ion repeller 320 can be positioned adjacent to an entrance aperture 306, and the lens assembly 350 can be positioned adjacent to an exit aperture 307. The electron source 310 and electrode 330 can be present together in a filament assembly held together by supporting structures 312, 313. If desired and as shown in FIG. 3B, an additional electrode 332 can be present adjacent to the collector 315 or can be positioned elsewhere in the source.

Figure 4A:
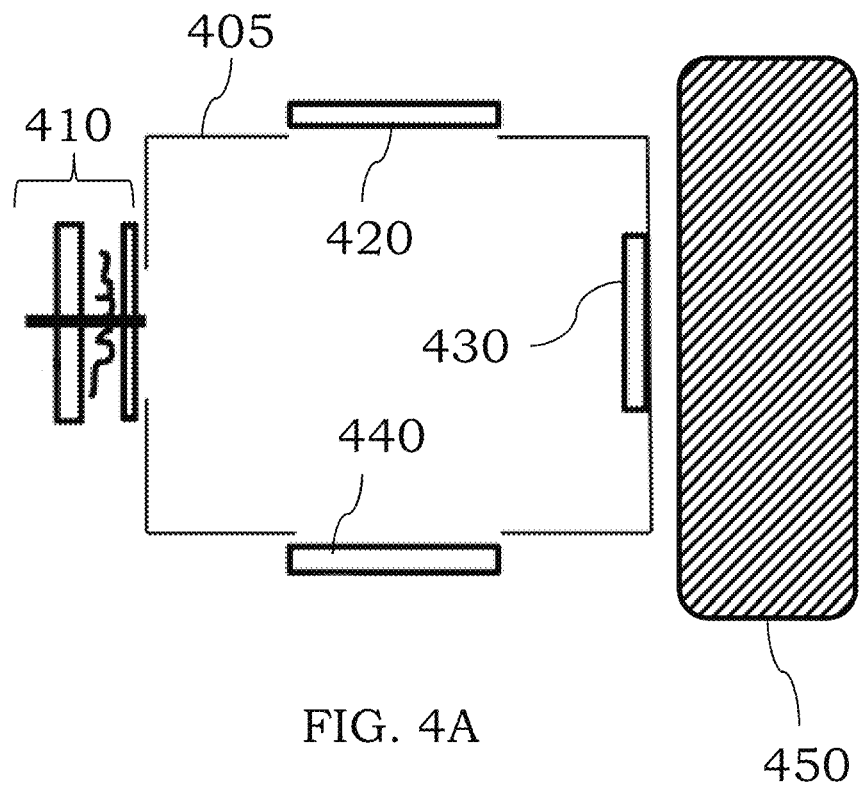
FIG. 4A is an illustration of an ionization source comprising a first magnet, in accordance with some examples.
Figure 4B:
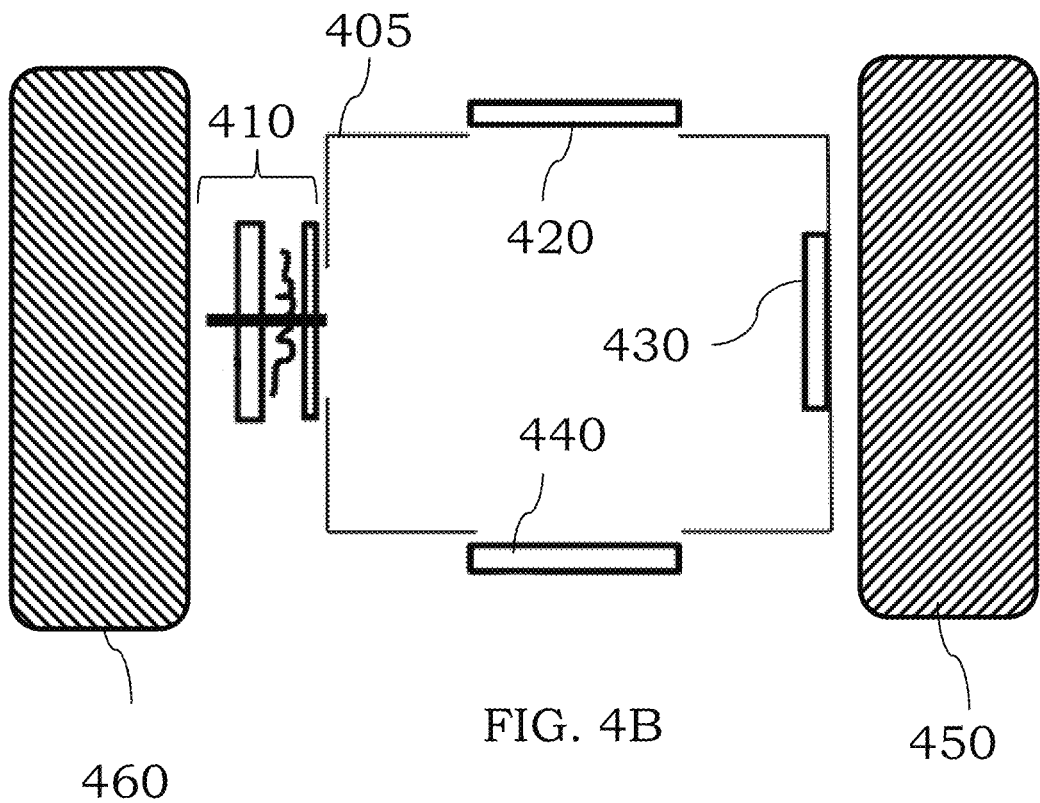
FIG. 4B is an illustration of an ionization source comprising two magnets, in accordance with certain examples.

In some examples, the ionization sources described herein may comprise one or more magnets. Referring to FIG. 4A, an ionization source is shown as comprising a filament cup electrode assembly 410, an ion repeller 420, an electron collector 430 and an exit lens assembly 440. A first magnet 450 is shown as being positioned adjacent to the electron collector 430. Without wishing to be bound by any particular theory, the magnet 450 can provide a magnetic field into the ionization block 405, which can alter the trajectory of the electrons and/or any ions, e.g., can increase the path length of ions within the ionization block 405. If desired, a second magnet 460 may also be present a shown in FIG. 4B to assist in providing the magnetic field into the ionization block 405. The magnets 450, 460 may independently be temporary magnets, permanent magnets, superconducting magnets, rare earth magnets, or may take other forms. In some embodiments, the magnets 450, 460 may each be temporary magnets that can be electrically coupled to a power source so that a current provided to the magnets results in a magnetic field being provided into the ionization block 405.

Figure 5A:
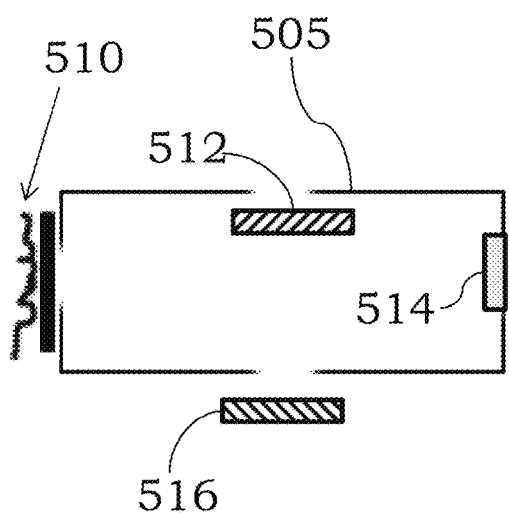
FIGS. 5A, 5B, 5C and 5D are illustrations of different configurations of ionization blocks, in accordance with some embodiments.
Figure 5B:
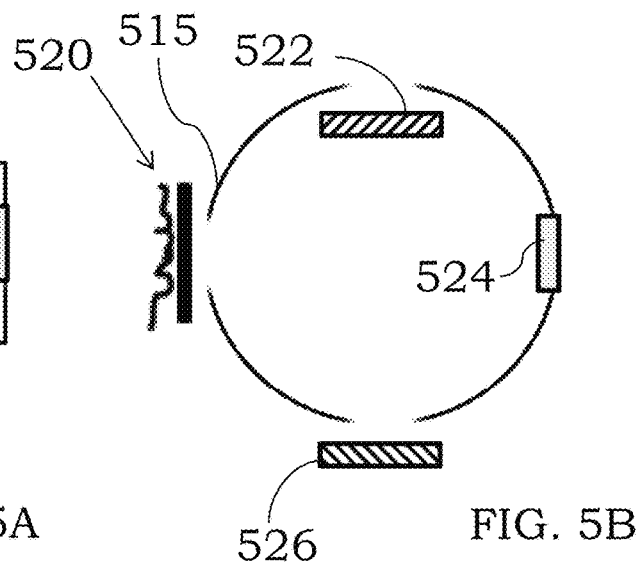
Figure 5C:
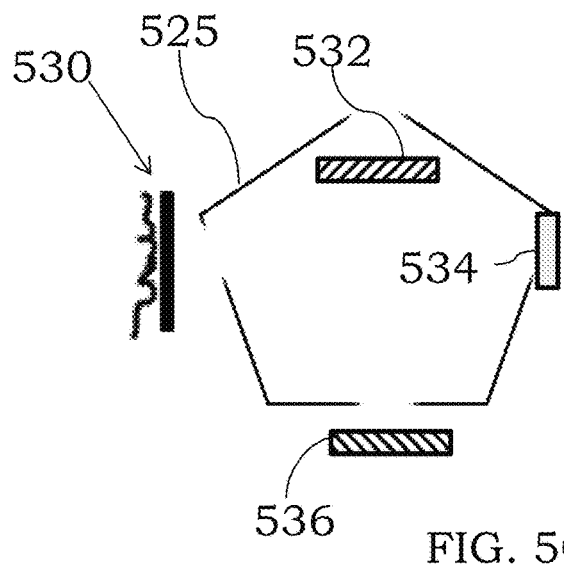
Figure 5D:
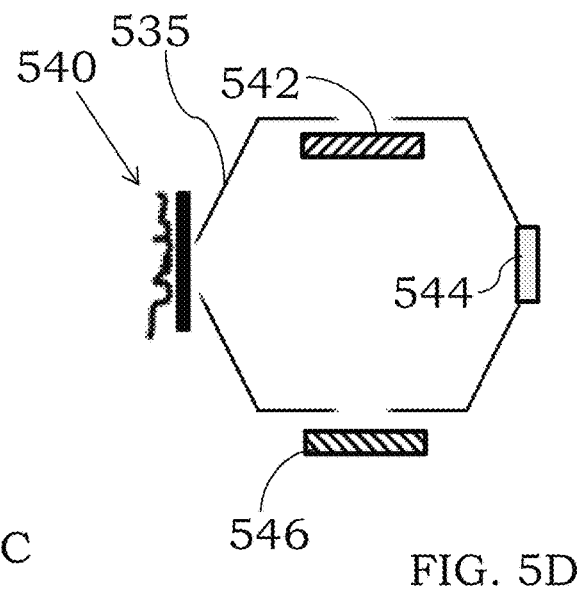

In some examples, the exact shape and dimensions of the ionization chamber and/or ionization block may vary. While FIGS. 1A-4B show chambers or blocks that are generally square, square shapes are not required. Referring to FIG. 5A, a rectangular ionization block 505 is shown that comprises an electron source/electrode assembly 510, an ion repeller 512, an electron collector 514 and an exit lens 516. Referring to FIG. 5B, a circular ionization block 515 is shown that comprises an electron source/electrode assembly 520, an ion repeller 522, an electron collector 524 and an exit lens 526. Referring to FIG. 5C, a pentagonal ionization block 525 is shown that comprises an electron source/electrode assembly 530, an ion repeller 532, an electron collector 534 and an exit lens 536. Referring to FIG. 5D, a hexagonal ionization block 535 is shown that comprises an electron source/electrode assembly 540, an ion repeller 542, an electron collector 544 and an exit lens 546. Additional shapes and configurations of an ionization block may also be used. By selecting shapes with more than four sides, the electrode positioning can be varied and additional spatial separation between the electrode and the other components of the source can be achieved.

Figure 6:
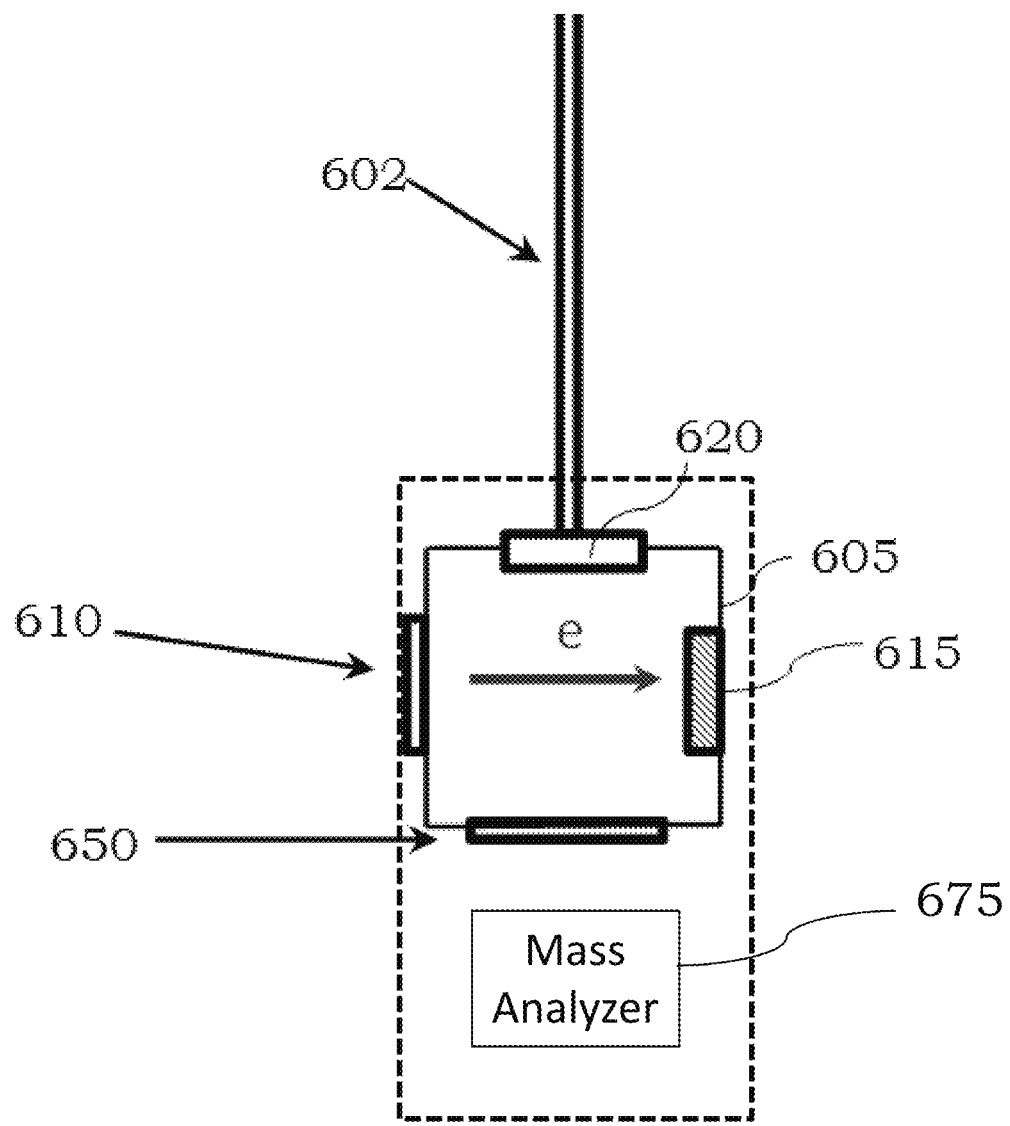
FIG. 6 is an illustration of an ionization source fluidically coupled to a transfer line and to a mass analyzer, in accordance with some examples.

In some examples, the ionization sources described herein can be directly coupled to a mass analyzer. One illustration is shown in FIG. 6, where an ionization source is directly coupled to a mass analyzer 675 without any intervening components between them. The source comprises an ionization block 605, a filament cup lens assembly 610 comprising an electron source and an electrode, an electron collector 615, an ion repeller 620 and a lens 650 (or lens assembly). A transfer line 602 is shown that can be coupled to an upstream component such as a sample introduction device (not shown). The exit lens assembly can be positioned adjacent to an inlet of the mass analyzer 675 so ions exiting the block 605 are provided directly to the first stage of the mass analyzer 675. If desired, one or more additional lenses (or other components) could be placed between the lens 650 and the inlet of the mass analyzer 675.

Figure 7:
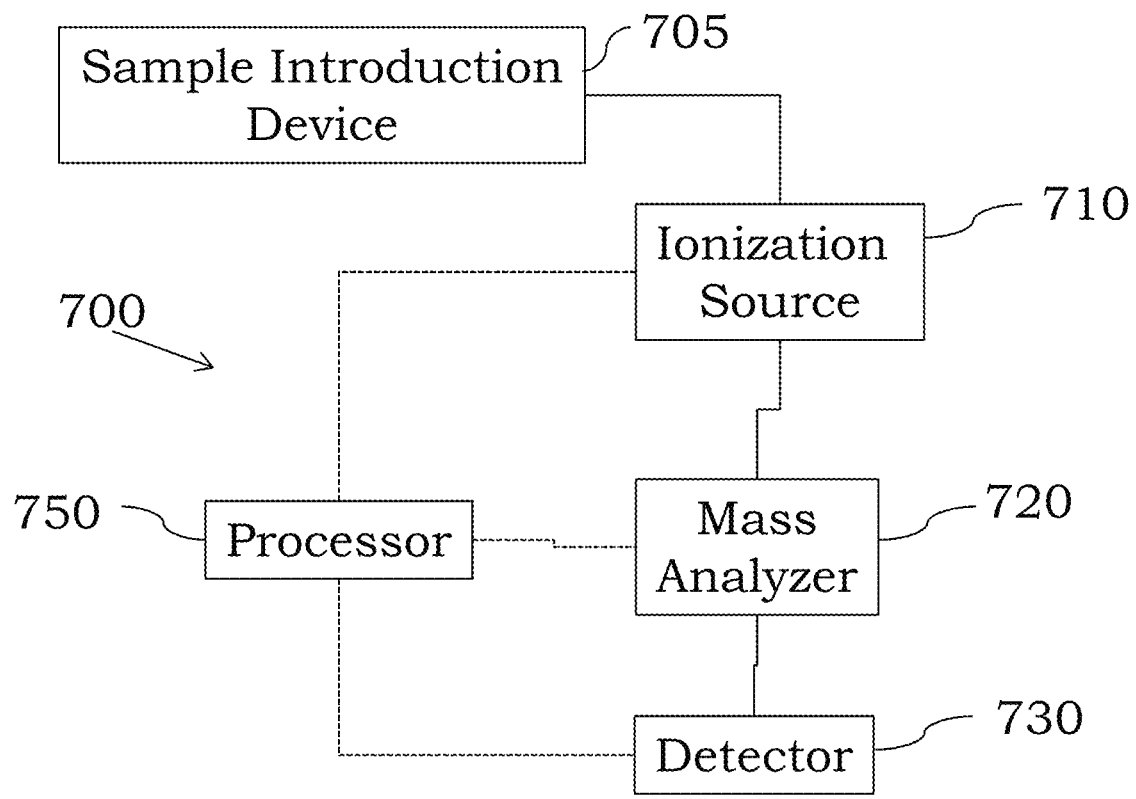
FIG. 7 is an illustration of a mass spectrometer system, in accordance with certain embodiments.

In certain embodiments, the ionization sources described herein can be used with various different types of mass analyzers. For example and referring to FIG. 7, a sample introduction device 705 can be fluidically coupled to an ionization source 710. A mass analyzer 720 is fluidically coupled to the ionization source 710, and a detector 730 is fluidically coupled to the mass analyzer 720. A processor 750 is shown as being electrically coupled to each of the ionization source 710, the mass analyzer 720 and the detector 730. If desired, the processor 750 can also be electrically coupled to the sample introduction device 705. The mass analyzer 720 and the detector 730 may be operated at reduced pressures using one or more vacuum pumps and/or vacuum pumping stages as noted in more detail below. The sample introduction device 705 may be a GC system, an LC system, a nebulizer, aerosolizer, spray nozzle or head or other devices which can provide a gas or liquid sample to the ionization source 710. Where solid samples are used the sample introduction device 705 may comprise a direct sample analysis (DSA) device or other devices which can introduce analyte species from solid samples. The ionization source 710 may be any of those described herein or other suitable ionization sources. The mass analyzer 720 can take numerous forms depending generally on the sample nature, desired resolution, etc. and exemplary mass analyzers are discussed further below. The detector 730 can be any suitable detection device that can be used with existing mass spectrometers, e.g., electron multipliers, Faraday cups, coated photographic plates, scintillation detectors, etc. and other suitable devices that will be selected by the person of ordinary skill in the art, given the benefit of this disclosure. The processor 750 typically includes a microprocessor and/ or computer and suitable software for analysis of samples introduced into the MS device 700. If desired, one or more databases can be accessed by the processor 750 for determination of the chemical identity of species introduced into the MS device 700. Other suitable additional devices known in the art can also be used with the MS device 700 including, but not limited to, autosamplers, such as AS-90plus and AS-93plus autosamplers commercially available from PerkinElmer Health Sciences, Inc and thermodesorbers commercially available from PerkinElmer Health Sciences, Inc.

In certain embodiments, the mass analyzer 720 of MS device 700 can take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. As noted in more detail below, the mass analyzer may comprise two or more different devices arranged in series, e.g., tandem MS/MS devices or triple quadrupole devices, to select and/or identify the ions that are received from the ionization source 710.

Figure 8:
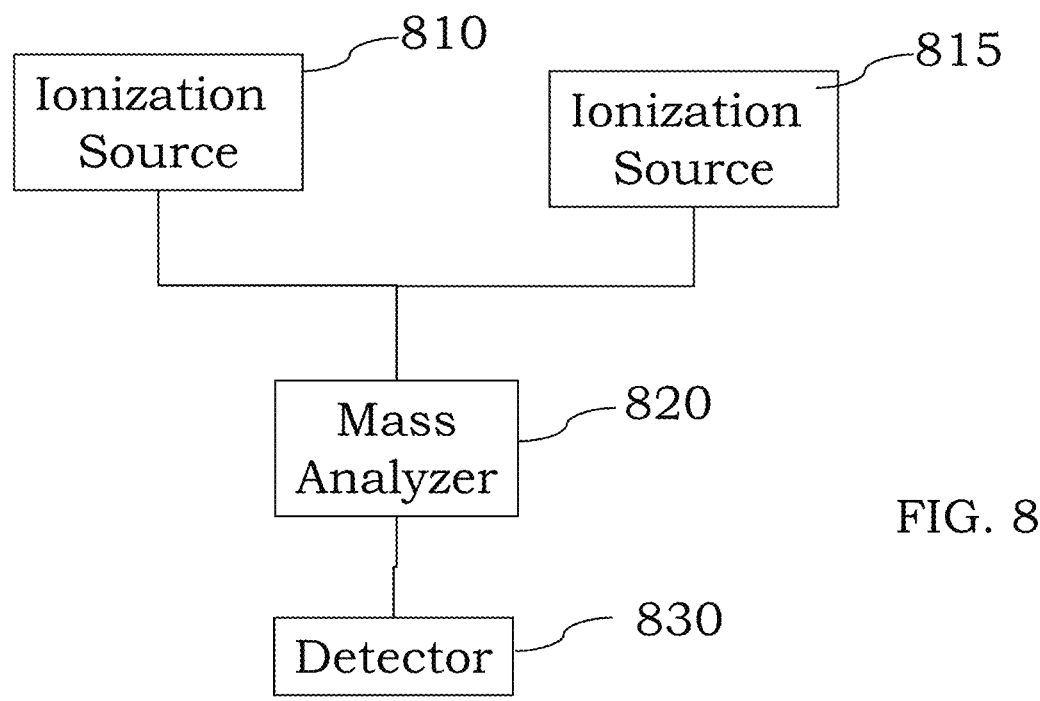
FIG. 8 is an illustration of a system comprising two ionization sources, in accordance with some examples.

In certain other examples, the ionization sources disclosed herein may be used with existing ionization methods used in mass spectroscopy. For example, a MS instrument with a dual source where one of the sources is an ionization source as described herein and the other source is a different ionization source can be assembled. Referring to FIG. 8, a first ionization source 810 and a second ionization source 815 are shown as being fluidically coupled to a mass analyzer 820, which itself is fluidically coupled to a detector 830. An interface, valve or other components may be present between the source 810, 815 and the mass analyzer 820 to control fluid flow between the components. One or both of the ionization sources 810, 815 may be one of the ionization sources described herein. In some examples, one of the ionization sources 810, 815 is one of the ionization sources described herein and the other of the ionization sources 810, 815 is a different ionization source. The different ionization source may be, for example, an electron impact source, a chemical ionization source, a field ionization source, desorption sources such as, for example, those sources configured for fast atom bombardment, field desorption, laser desorption, plasma desorption, thermal desorption, electrohydrodynamic ionization/desorption, etc., thermospray or electrospray ionization sources or other types of ionization sources. By including two different ionization sources in a single instrument, a user can select which particular ionization methods may be used.

In accordance with certain other examples, the MS devices disclosed here can be hyphenated with one or more other analytical techniques. For example, a MS system can be hyphenated one or more devices for performing liquid chromatography, gas chromatography, capillary electrophoresis, and other suitable separation techniques. When coupling an MS device to a gas chromatograph, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces can be used so that only a small amount of sample exiting the liquid chromatograph is introduced into the MS device. Sample exiting from the liquid chromatograph may also be deposited in suitable wires, cups or chambers for transport to the ionization source of the MS device. In certain examples, the liquid chromatograph may include a thermospray configured to vaporize and aerosolize sample as it passes through a heated capillary tube. Other suitable devices for introducing liquid samples from a liquid chromatograph into a MS device, will be readily selected by the person of ordinary skill in the art, given the benefit of this disclosure.

In certain examples, an MS device that includes an ionization source may be hyphenated to at least one other MS device, which may or may not include its own ionization source, for tandem mass spectroscopy analyses. For example, one MS device can include a first type of mass analyzer and the second MS device can include a different or similar mass analyzer than the first MS device. In other examples, the first MS device may be operative to isolate the molecular ions, and the second MS device may be operative to fragment/detect the isolated molecular ions. It will be within the ability of the person of ordinary skill in the art, to design hyphenated MS/MS devices at least one of which includes an ionization source as described herein. In some examples, the MS device may comprise two or more quadrupoles which can be configured the same or different. For example, a triple quadrupole assembly as shown in the examples appended hereto may be used to select ions from an ion beam exiting an ionization source.

In certain examples, the methods and systems herein may comprise or use a processor, which can be part of the system or instrument or present in an associated device, e.g., computer, laptop, mobile device, etc. used with the instrument. For example, the processor can be used to control the provided voltages to the electrode, ionization block, ion repeller, electron collector, etc., can control the mass analyzer and/or can be used by the detector. Such processes may be performed automatically by the processor without the need for user intervention or a user may enter parameters through user interface. For example, the processor can use signal intensities and fragment peaks along with one or more calibration curves to determine an identity and how much of each molecule is present in a sample. In certain configurations, the processor may be present in one or more computer systems and/or common hardware circuitry including, for example, a microprocessor and/or suitable software for operating the system, e.g., to control the sample introduction device, ionization device, mass analyzer, detector, etc. In some examples, the detector itself may comprise its own respective processor, operating system and other features to permit detection of various molecules. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibration curves, analyte peaks, and data values during operation of the systems. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. For example, computer control can be implemented to control sample introduction, electrode voltages, ion repeller voltages, electron collector voltages, ionization block voltages, voltages provided to components of the mass analyzer, detector parameters, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed.

A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware.

In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system. Further, the processor can be designed as a quantum processor designed to perform one or more functions using one or more qubits.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. Various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

In certain examples, the processor may also comprise or have access to a database of information about molecules, their fragmentation patterns, and the like, which can include molecular weights, mass-to-charge ratios and other common information. The instructions stored in the memory can execute a software module or control routine for the system, which in effect can provide a controllable model of the system. The processor can use information accessed from the database together with one or software modules executed in the processor to determine control parameters or values for different components of the systems, e.g., different electrode voltages, different mass analyzer parameters, etc. Using input interfaces to receive control instructions and output interfaces linked to different system components in the system, the processor can perform active control over the system. For example, the processor can control the detector, sample introduction devices, ionization sources, electrodes, mass analyzer and other components of the system.

Figure 9:
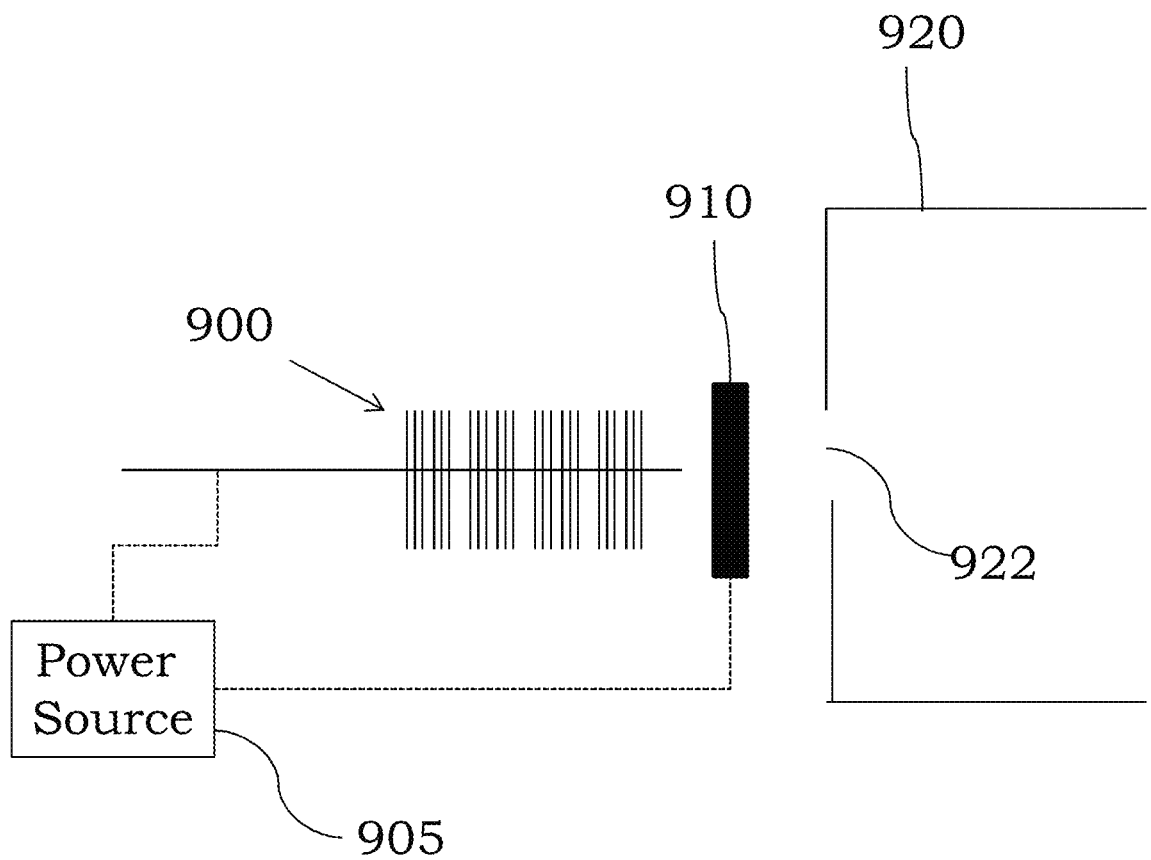
FIG. 9 is an illustration of an emitter fluidically coupled to a mass analyzer, in accordance with certain embodiments.

In some examples, the electrodes used in the ionization sources described herein can also be used in field ionization or field desorption sources. Referring to FIG. 9, an emitter 900 is shown that may comprise whiskers, fine tips, etc. The emitter 900 is electrically coupled to a power source 905. An electrode 910 is placed between the emitter 900 and an inlet 922 of a mass analyzer 920. The electrode 910 may also be electrically coupled to the power source 905. The emitter 900 can be dipped into a sample and may retain analyte in the sample on a surface of the emitter 900. When a voltage is provided to the emitter 900 from the power source 905, electrons from analyte molecules can be extracted and analyte can be ionized. The ionized analyte can be transported through the electrode 910 and into the inlet 922 of the mass analyzer 920. The electric field provided by the electrode 910 can further control or tune the ionization of the analyte molecules when a voltage is applied to it. Alternatively, no voltage may be provided to the electrode 910, and the emitter 900 may ionize analyte molecules using conventional field desorption/ionization. While not shown, a processor can be electrically coupled to the electrode 910 and configured to provide a first voltage to the electrode 910 in a first mode of the field ionization source and can be configured to provide a second voltage to the electrode 910 in a second mode of the field ionization source. The emitter 900 may take many different configurations including a single tip emitter, a wire emitter or a blade emitter, fine wires, etc.

Figure 10:
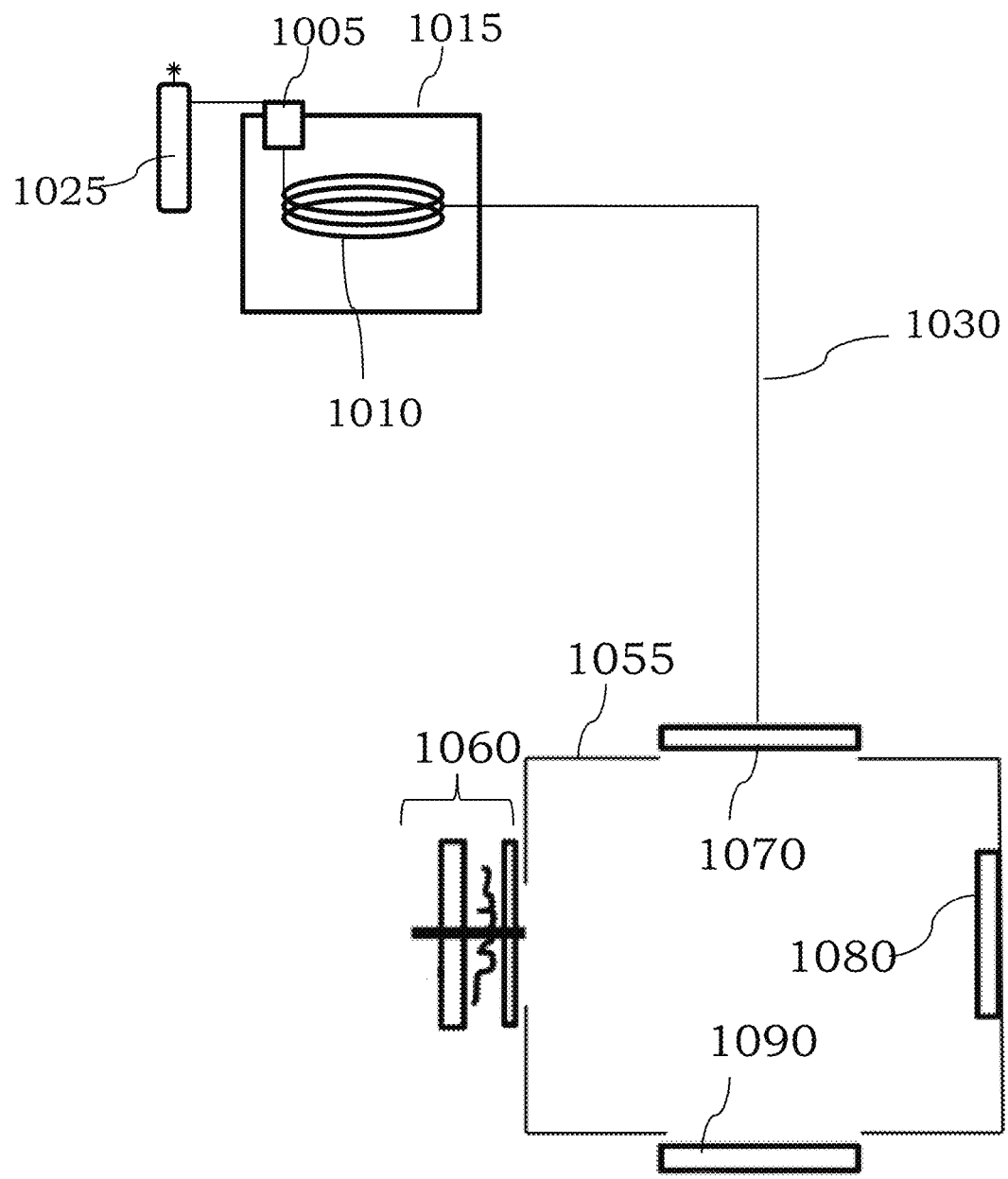
FIG. 10 is an illustration of a gas chromatography system fluidically coupled to an ionization source, in accordance with certain examples.

In some embodiments, the ionization sources described herein may be fluidically coupled to one or more separation systems. Referring to FIG. 10A, an ionization source fluidically coupled to a gas chromatography system is shown. The gas chromatography system comprises an injector 1005 fluidically coupled to column 1010 and a mobile phase. The column 1010 is positioned in an oven 1015 to control the temperature of the mobile phase and analyte and to keep the analyte in gaseous form. A transfer line 1030 fluidically couples the column 1010 to an inlet of an ionization source. The transfer line 1030 can also be heated if desired to maintain eluting analyte from the column 1010 in the gas phase. The ionization source may be any of those described herein. For example, the ionization source may comprise an ionization block 1055, an electron source/electrode assembly 1060, an ion repeller 1070, an electron collector 1080 and an exit lens 1090. As individual analytes elute from the column 1010, they may be provided to the ionization block 1055 where they can be ionized using electrons from the source/electrode assembly 1060. The ionized analyte may exit through an exit aperture of the ionization block 1055 toward the exit lens 1090 and be provided to a downstream component such as, for example, a mass analyzer. If desired, additional components may be present between the column 1010 and the ionization block 1055, e.g., interfaces, splitters, an optical detection cell, concentration chambers, filters and the like.

Figure 11:
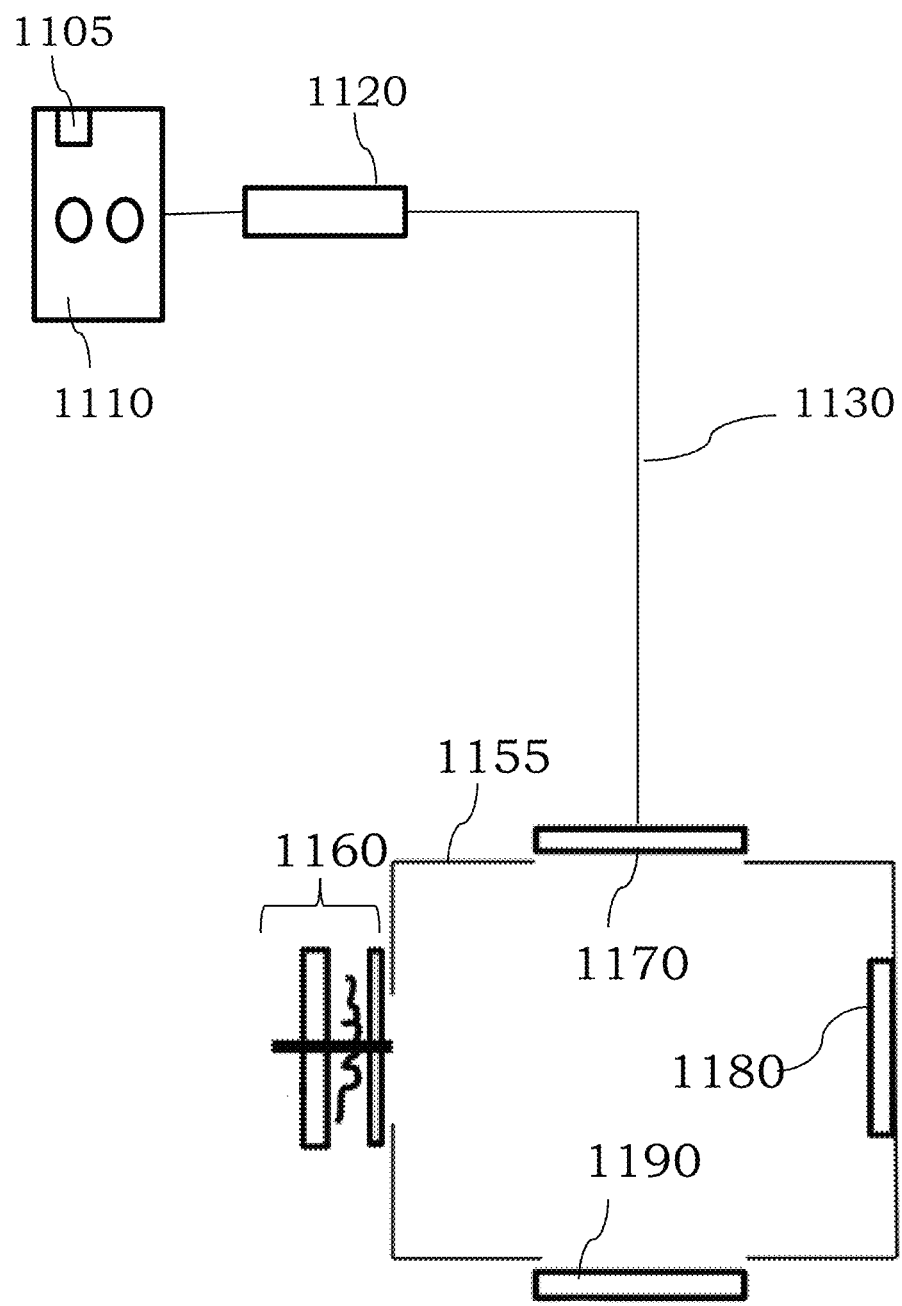
FIG. 11 is an illustration of a liquid chromatography system fluidically coupled to an ionization source, in accordance with certain examples.

In some embodiments, an ionization source can be fluidically coupled to a liquid chromatography (LC) system. Referring to FIG. 11, a LC system comprises an injector 1105 fluidically coupled to a column 1120 through one or more pumps 1110. The injector 1105 and/or column 1120 are also fluidically coupled to a mobile phase, i.e. a liquid, and the one or more pumps 1110 can be used to pressurize the LC system. The column 1120 typically comprises a stationary phase selected to separate two or more analytes in an introduced sample. As individual analytes elute from the column 1120, they can be provided to an inlet of an ionization source for ionization. While the column 1120 is shown as being directly coupled to an inlet of the ionization block 1155, one or more transfer lines, interfaces, etc. could instead be used. For example, a flow splitter can be used if desired. Additional components may also be present between the column 1120 and the ionization block 1155, e.g., interfaces, splitters, an optical detection cell, concentration chambers, filters and the like. A transfer line 1130 fluidically couples the column 1120 to an inlet of an ionization source. The transfer line 1130 can also be heated if desired. The ionization source may be any of those described herein. For example, the ionization source may comprise an ionization block 1155, an electron source/electrode assembly 1160, an ion repeller 1170, an electron collector 1180 and an exit lens 1190. As individual analytes elute from the column 1120, they may be provided to the ionization block 1155 where they can be ionized using electrons from the source/electrode assembly 1160. The ionized analyte may exit through an exit aperture of the ionization block 1155 toward the exit lens 1190 and be provided to a downstream component such as, for example, a mass analyzer.

In certain examples, the ionization sources described herein can be used in one or more methods to ionize and/or analyze one or more analytes. For example, an analyte can be introduced into an ionization chamber comprising an electron source and an electron collector positioned coaxially with the electron source and configured to receive electrons from the electron source. The ionization source may comprise at least one electrode configured to provide an electric field when a voltage is provided to the at least one electrode. If desired, an ionization gas may also be introduced into the ionization chamber. In some embodiments, a voltage provided to the at least one electrode can be selected to increase production of a parent analyte ion produced from ionization of the introduced analyte. For example, a voltage can be provided to the electrode to decrease the energy of incident electrons and reduce fragmentation levels of a particular analyte. This process can increase production of precursor or parent ions and reduce formation of daughter ions. By increasing production of precursor ions, more accurate quantitation of analyte can be achieved.

In certain embodiments, the analyte can be introduced into the ionization block orthogonally to an electron flow from the electron source to the electron collector, though this orientation is not required. In some examples, a first analyte is introduced into the ionization chamber, and a first voltage is provided to the at least one electrode when the first analyte is introduced into the ionization chamber to provide ionized first analyte. The ionized first analyte can exit the ionization chamber through an exit aperture of the ionization chamber. A second analyte can then be introduced into the ionization chamber, and a second voltage can be provided to the at least one electrode when the second analyte is introduced into the ionization chamber to provide ionized second analyte. The provided first voltage can be different than the provided second voltage. In this manner, electrode voltages for individual analytes can be selected to further control fragmentation of different analytes.

In some examples, the ionization sources described herein may be packaged in a kit optionally with instructions for using the ionization source to ionize analytes. For example, an ionization source as described herein may be present along with information for using the ionization source and any associated electrode to ionize one or more analytes. The ionization methodology may optionally implement an ionization gas where it is desirable to perform chemical ionization.

Certain specific examples of the technology are described to facilitate a better understanding of the technology described herein.

Example 1

Figure 12:
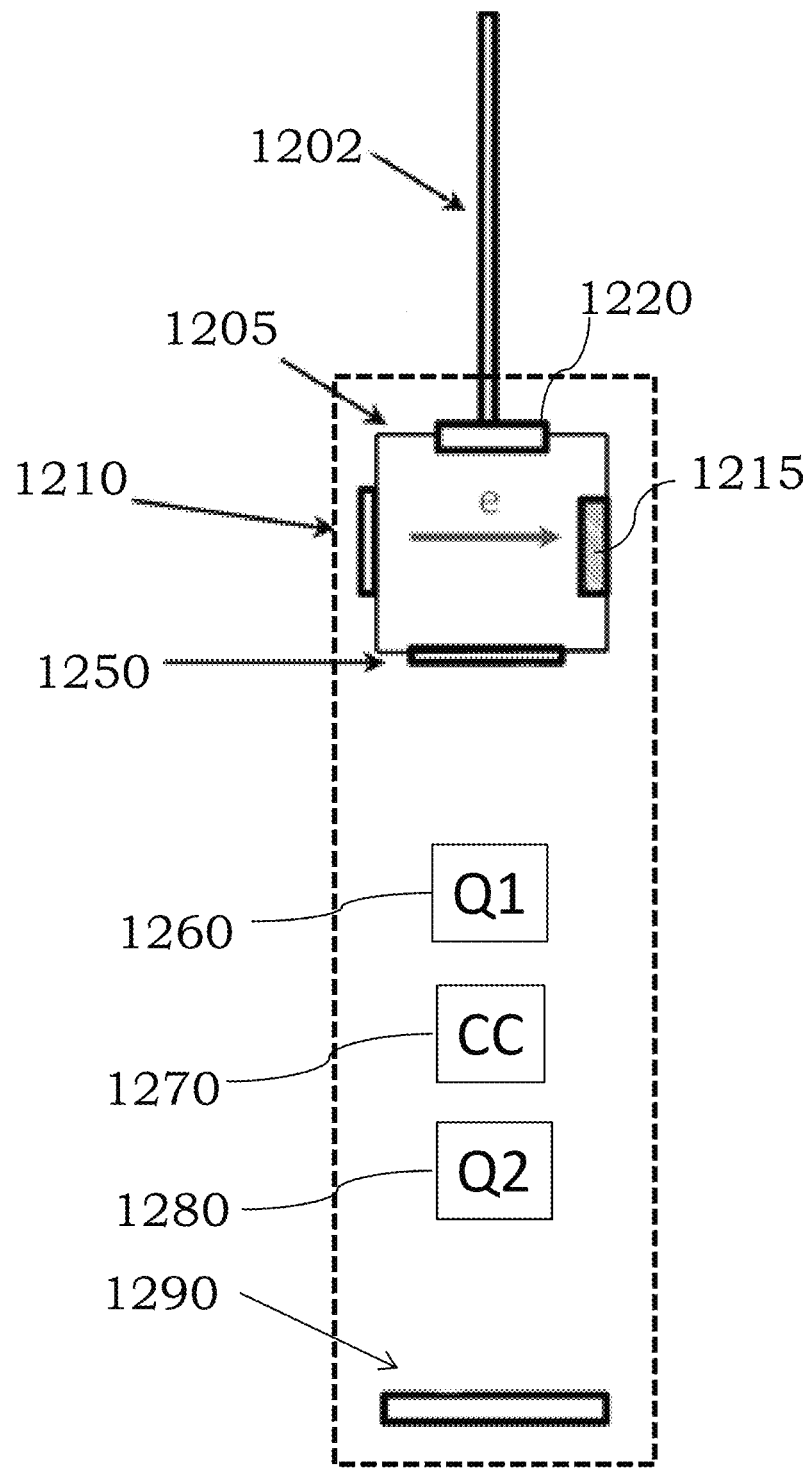
FIG. 12 is an illustration of an ionization source fluidically coupled to a mass analyzer, in accordance with some configurations.

A gas chromatography instrument can be fluidically coupled to an ionization source which itself is fluidically coupled to a triple quadrupole mass analyzer. Referring to FIG. 12, an ionization source/mass analyzer assembly comprises a transfer line 1202 fluidically coupled to an inlet aperture of an ionization block 1205. An electron source/electrode assembly 1210 (e.g., a filament cup assembly) is fluidically coupled to the ionization block 1205. An electron collector 1215 is positioned to receive electrons from the electron source/electrode assembly 1210. An ion repeller 1220 is positioned adjacent to the inlet aperture of the block 1205, and an exit lens assembly 1250 is positioned adjacent to an exit aperture of the block 1205. The lens assembly 1250 is fluidically coupled to a first quadrupole 1260 (Q1), which can be configured to select ions. The first quadrupole 1260 is fluidically coupled to a second quadrupole 1270, which can be configured as a collision cell (CC). The second quadrupole 1270 is fluidically coupled to a third quadrupole 1280 (Q2), which can be configured to select ions. The third quadrupole 1280 is fluidically coupled to a detector 1290 which can detect the selected ions. The ionization block 1205 can be operated at various pressures including for example, about $10^{-6}$-$10^{-4}$ Torr, e.g., about $10^{-5}$ Torr. The components downstream of the ionization block are typically operated at a pressure less than the pressure present in the ionization block 1205. For example, the pressure of the quadrupole 1260, the collision cell 1270, the quadrupole 1280 and the detector 1290 may be about $10^{-5}$ Torr, $10^{-6}$ Torr or less.

Example 2

Figure 13:
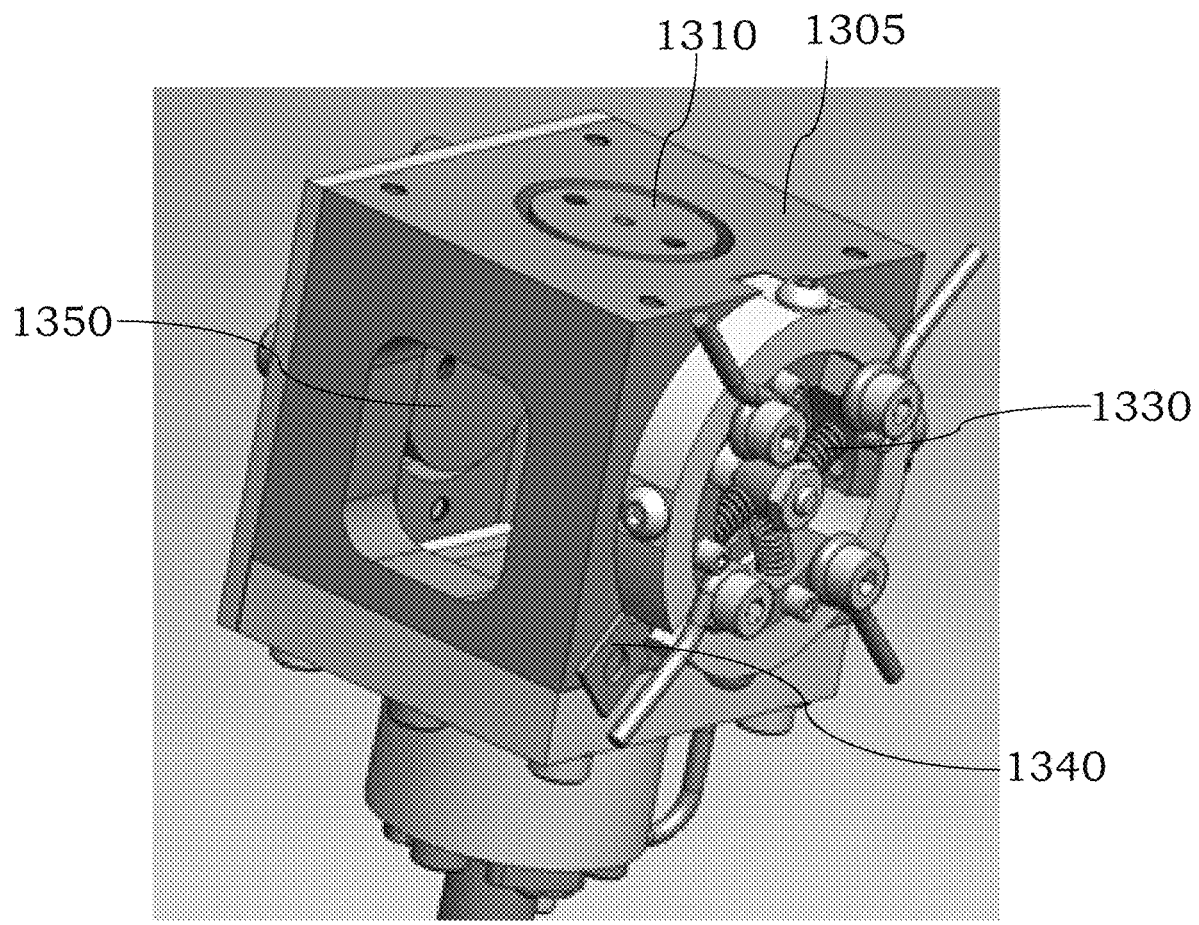
FIG. 13 is an illustration of an ionization source, in accordance with certain embodiments.

An illustration of an ionization source is shown in FIG. 13 to better show the positioning of the electrode with respect to the filaments. The ionization source comprises an ionization block 1305, a filament assembly 1330 comprising three filaments, an electrode 1340 that also function as a brace and is positioned between the filament assembly 1330 and the ionization block 1305, an ion repeller 1310 and an electron collector 1350.

Example 4

Figure 14:
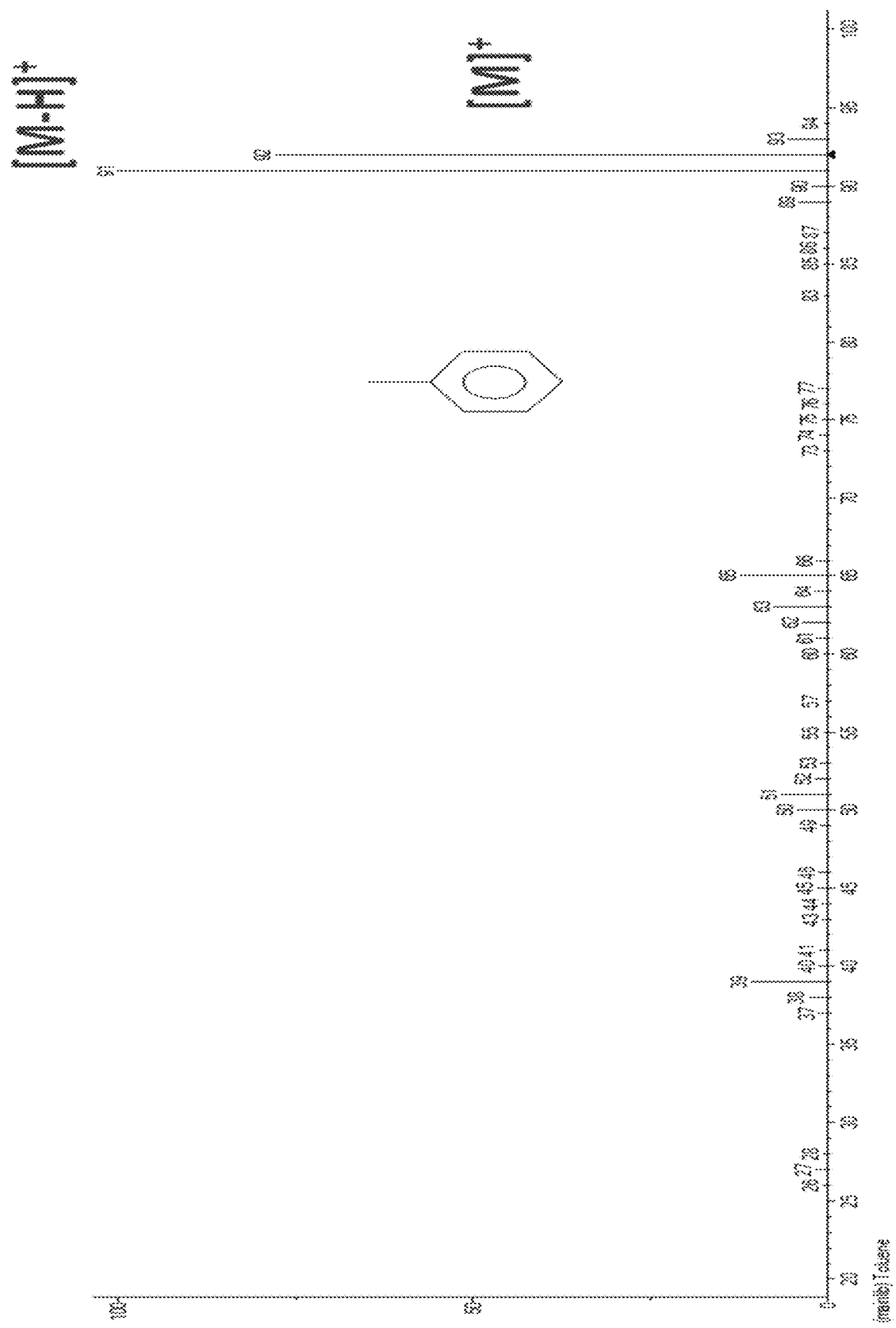
FIG. 14 is a NIST spectrum of toluene where conventional electron ionization is used.

FIG. 14 shows a NIST spectrum for toluene ($C_7H_8$) obtained using conventional electron ionization (EI). For reference, the 91 amu/92 amu peak ratio is 1.3 and the 91 amu/65 amu peak ratio is 8.3 in FIG. 14.

Figure 15:
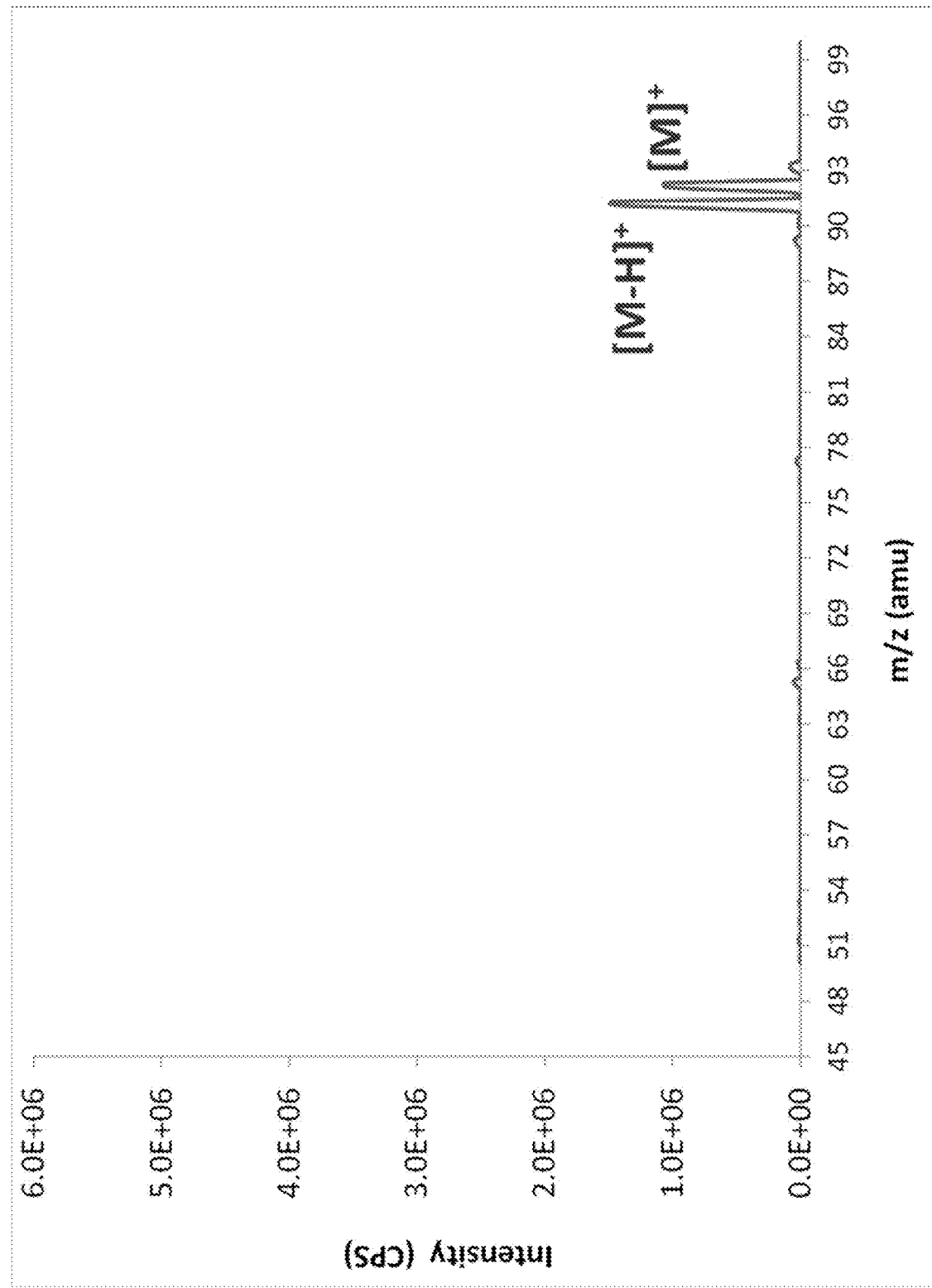
FIG. 15 is a mass spectrum of toluene where a voltage of −10 Volts was provided to a filament cup assembly.

Referring to FIG. 15, a voltage of −10 Volts was provided to the electrode of the filament cup assembly. The 91 amu/92 amu peak ratio was 1.4 and the 91 amu/65 amu peak ratio was 30. Compared to the peak ratios using conventional EI, fewer fragments with mass 65 were produced by providing the selected voltage to the electrode.

Figure 16:
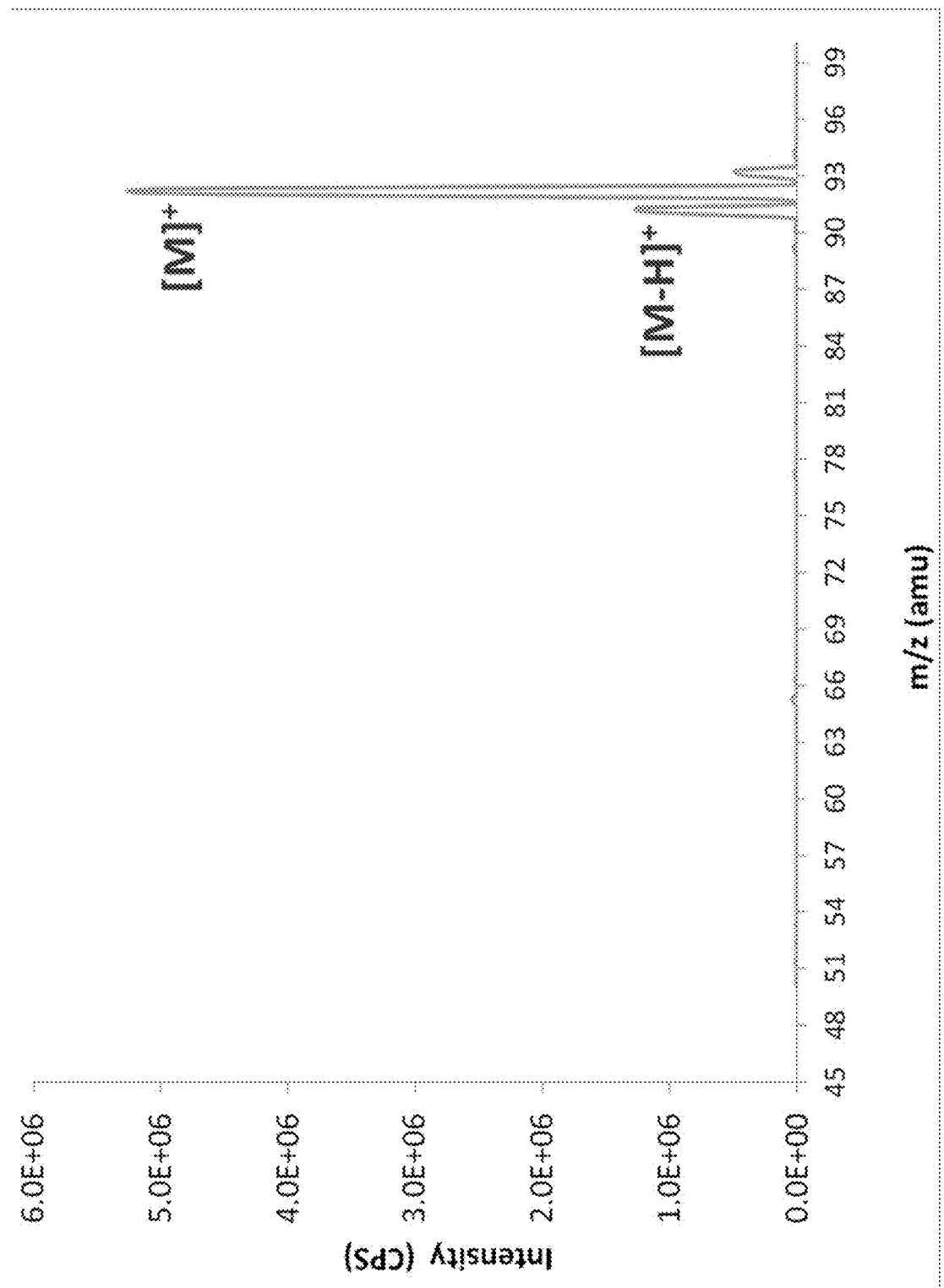
FIG. 16 is a mass spectrum of toluene where a voltage of −14 Volts was provided to a filament cup assembly.

Referring to FIG. 16, a voltage of −14 Volts was provided to the electrode of the filament cup assembly. The 91 amu/92 amu peak ratio was 0.2 and the 91 amu/65 amu peak ratio was 85. Compared to the peak ratios using conventional EI, fewer fragments were produced by providing the selected voltage of −14 Volts to the electrode. Further, the higher voltage of −14 Volts resulted in reduced amounts of the mass 65 fragment as compared to an amount of mass 65 fragment produced using −10 Volts. An increase in parent ion formation was also observed.

Example 5

Figure 17:
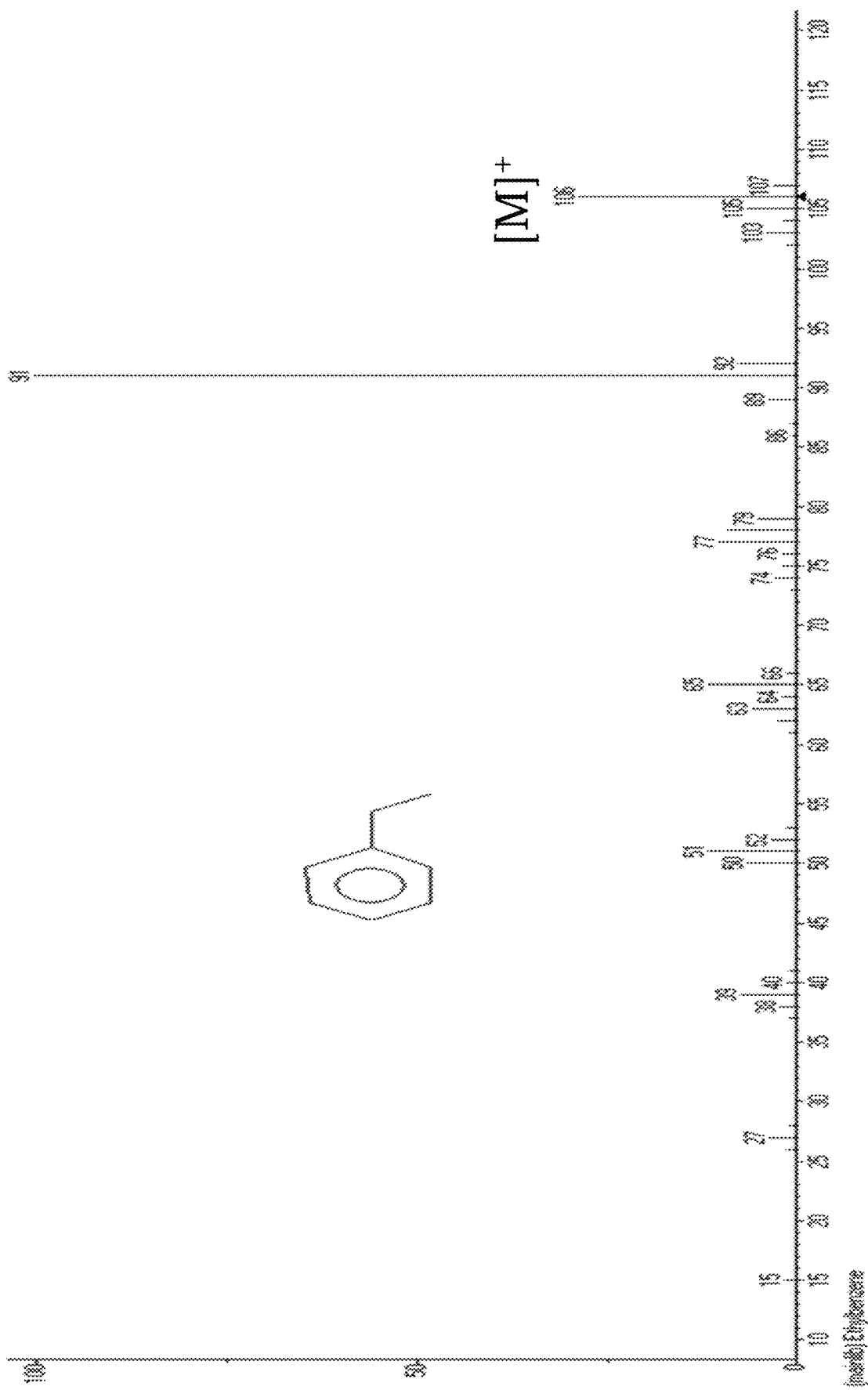
FIG. 17 is a NIST spectrum of ethylbenzene where conventional electron ionization is used.
Figure 18:
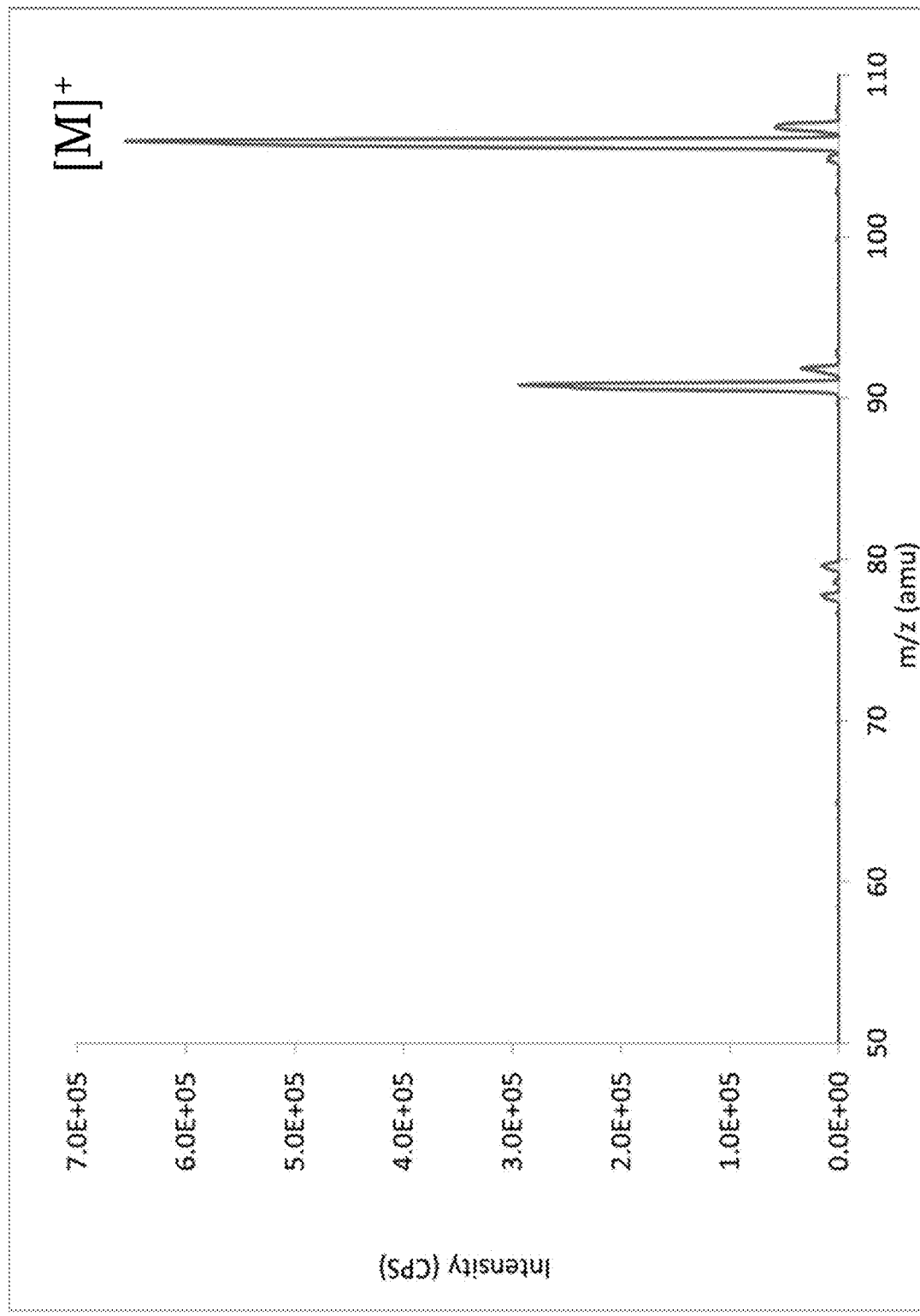
FIG. 18 is a mass spectrum of ethylbenzene where a voltage of −15 Volts was provided to a filament cup assembly.

FIG. 17 shows a NIST spectrum for ethylbenzene ($C_8H_{10}$) obtained using conventional electron ionization (EI). For reference, the 91 amu/106 amu peak ratio is 3.54 in FIG. 17. Referring to FIG. 18, a voltage of −15 Volts was provided to the electrode of the filament cup assembly. The 91 amu/106 amu peak ratio that was measured was 0.45 indicating an increased amount of the parent ion was present when the selected voltage was provided to the filament cup assembly electrode.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An ionization source comprising:
an ionization block comprising first, second, third and fourth supporting structures coupled to each other to form an ionization chamber, the first supporting structure comprising an entrance aperture configured to receive an analyte, wherein the third supporting structure comprises an exit aperture configured to permit ionized analyte to exit the ionization block;
an electron source fluidically coupled to a first aperture in the second supporting structure of the ionization block;
an electron collector positioned substantially coaxially with the electron source and within the ionization chamber and adjacent to the fourth supporting structure, wherein the electron collector is configured to receive electrons from the electron source that enter into the ionization chamber through the first aperture in the second supporting structure;
an ion repeller positioned adjacent to the entrance aperture of the first supporting structure of the ionization block and positioned substantially orthogonal to the electron source; and
at least one electrode configured to provide an electric field within the ionization chamber when a voltage is provided to the at least one electrode to control a fragmentation pattern of the analyte received in the ionization chamber.

2. The ionization source of claim 1, wherein the at least one electrode is positioned adjacent to the electron source or wherein the at least one electrode is positioned adjacent to the electron collector.

3. The ionization source of claim 1, wherein the electron source comprises a plurality of independent filaments present in a filament cup lens assembly.

4. The ionization source of claim 3, further comprising a processor electrically coupled to the at least one electrode and configured to provide a first voltage to the at least one electrode in a first mode of the ionization source and configured to provide a second voltage to the at least one electrode in a second mode of the ionization source.

5. The ionization source of claim 3, further comprising at least one lens positioned adjacent to the exit aperture and configured to guide the ionized analyte in the ionization block toward the exit aperture.

6. The ionization source of claim 3, further comprising a second electrode, wherein the at least one electrode is positioned adjacent to the electron source and the second electrode is positioned adjacent to the electron collector.

7. The ionization source of claim 3, further comprising at least one magnet positioned adjacent to and outside of the ionization block.

8. The ionization source of claim 1, wherein the at least one electrode is configured to receive a direct current voltage to provide a direct current electric field.

9. The ionization source of claim 1, wherein the ionization block is configured to directly couple to a mass analyzer.

10. The ionization source of claim 1, wherein the ionization block is configured to receive an ionization gas through an inlet in the first supporting structure of the ionization block.

11. A mass spectrometer comprising the ionization source of claim 1.

12. The mass spectrometer of claim 11, further comprising a mass analyzer, wherein the ionization block of the ionization source is directly coupled to the mass analyzer.

13. The mass spectrometer of claim 11, wherein the at least one electrode of the ionization source is positioned adjacent to the electron source or wherein the at least one electrode of the ionization source is positioned adjacent to the electron collector.

14. The mass spectrometer of claim 11, wherein the at least one electrode of the ionization source is configured to receive a direct current voltage to provide a direct current electric field.

15. The mass spectrometer of claim 11, wherein the electron source of the ionization source comprises a plurality of independent filaments present in a filament cup lens assembly.

16. The mass spectrometer of claim 11, wherein the ionization source comprises a second electrode, wherein the at least one electrode of the ionization source is positioned adjacent to the electron source, and wherein the second electrode of the ionization source is positioned adjacent to the electron collector.

17. A method of facilitating ionization of a first analyte comprising providing the ionization source of claim 1 to form ionized first analyte when the first analyte is introduced into the ionization source.

18. The method of claim 17, further comprising providing a voltage to the at least electrode to enhance formation of parent analyte ions produced from the introduced analyte.

19. The method of claim 18, wherein the provided voltage is a direct current voltage to provide a direct current electric field.

20. The method of claim 18, further comprising providing a second voltage, different than the first voltage, to the at least one electrode when a second analyte is introduced into the ionization source.

21. The method of claim 20, wherein each of the first voltage and the second voltage is a direct current voltage.

22. The method of claim 17, further comprising providing the formed, first ionized analyte to a mass analyzer directly coupled to the ionization block of the ionization source.

* * * * *